United States Patent
Totsuka et al.

(10) Patent No.: US 9,967,494 B2
(45) Date of Patent: May 8, 2018

(54) PHOTOELECTRIC CONVERSION APPARATUS AND PHOTOELECTRIC CONVERSION SYSTEM

(71) Applicant: CANON KABUSHIKI KAISHA, Tokyo (JP)

(72) Inventors: Hirofumi Totsuka, Fujisawa (JP); Daisuke Yoshida, Ebina (JP); Yasushi Matsuno, Fujisawa (JP); Takashi Muto, Kawasaki (JP); Toru Koizumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 15/059,970

(22) Filed: Mar. 3, 2016

(65) Prior Publication Data
US 2016/0261817 A1     Sep. 8, 2016

(30) Foreign Application Priority Data
Mar. 5, 2015 (JP) ................................. 2015-043890

(51) Int. Cl.
| | | |
|---|---|---|
| H04N 5/374 | (2011.01) | |
| H04N 5/3745 | (2011.01) | |
| H04N 5/363 | (2011.01) | |
| H04N 5/378 | (2011.01) | |
| H04N 5/369 | (2011.01) | |

(52) U.S. Cl.
CPC ......... *H04N 5/37457* (2013.01); *H04N 5/363* (2013.01); *H04N 5/374* (2013.01); *H04N 5/378* (2013.01); *H04N 5/3742* (2013.01); *H04N 5/3698* (2013.01)

(58) Field of Classification Search
CPC ...... H04N 5/363; H04N 5/3698; H04N 5/374; H04N 5/3742; H04N 5/37457; H04N 5/378
See application file for complete search history.

(56) References Cited

U.S. PATENT DOCUMENTS 9,219,872 B2 * 12/2015 Ohya ................. H04N 5/37455
9,838,633 B2 * 12/2017 Muto ..................... H04N 5/378
(Continued)

FOREIGN PATENT DOCUMENTS

JP        2013-146045 A        7/2013

*Primary Examiner* — Amy Hsu
(74) *Attorney, Agent, or Firm* — Canon U.S.A., Inc. IP Division

(57) ABSTRACT

A photoelectric conversion apparatus includes a pixel. The pixel includes a transfer transistor, a reset transistor, an amplification transistor, and a selection transistor. The photoelectric conversion apparatus includes a control line, a voltage control unit, and a current source. The control line is electrically connected to a source of the amplification transistor. The voltage control unit controls the voltage of the control line. The current source outputs a reference current. A path of a current from the amplification transistor is separated from a path of the reference current. The photoelectric conversion apparatus includes a comparison unit configured to compare the current from the amplification transistor with the reference current. During a period in which a transistor connected to the gate of the amplification transistor is in a conductive state, the selection transistor is in a non-conductive state.

22 Claims, 21 Drawing Sheets

(56) References Cited

U.S. PATENT DOCUMENTS

| | | | | |
|---|---|---|---|---|
| 2004/0008270 A1* | 1/2004 | Hisamatsu | ............ | H04N 5/185 348/257 |
| 2013/0154705 A1* | 6/2013 | Sakurai | ................ | H03K 3/86 327/179 |
| 2014/0160331 A1* | 6/2014 | Murakami | ............ | H04N 5/378 348/300 |

* cited by examiner

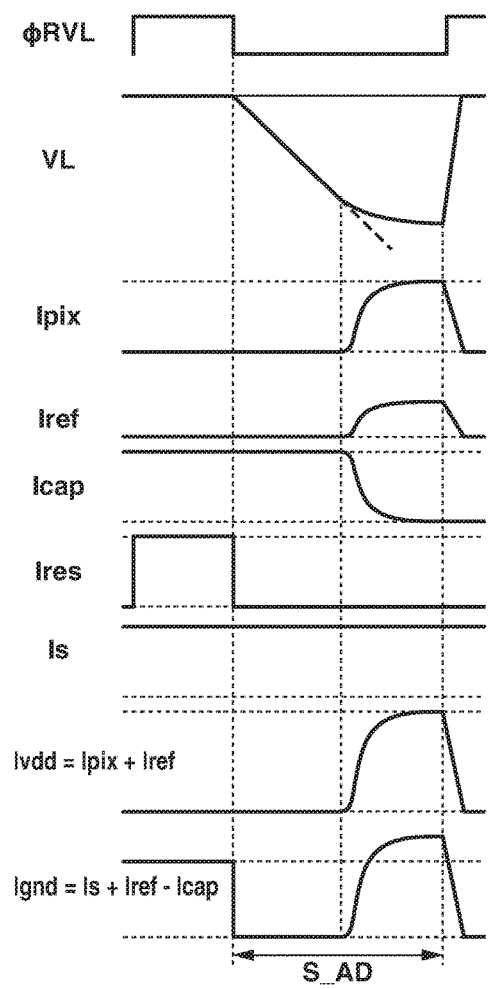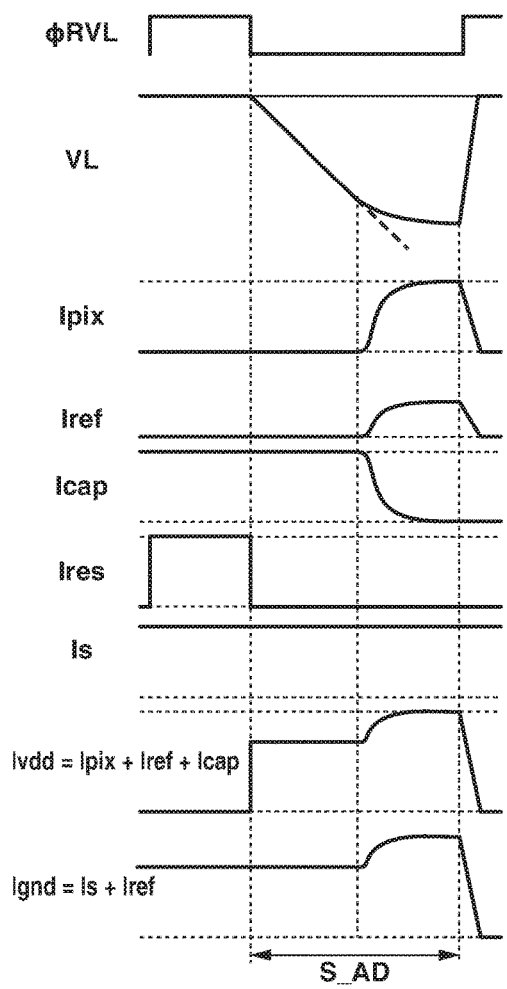

PHOTOELECTRIC CONVERSION APPARATUS AND PHOTOELECTRIC CONVERSION SYSTEM

BACKGROUND OF THE INVENTION

Field of the Invention

The present invention relates to a photoelectric conversion apparatus and a photoelectric conversion system.

Description of the Related Art

FIG. 2 of Japanese Patent Application Laid-Open No. 2013-146045 illustrates a photoelectric conversion apparatus including pixels (101) that output a current signal corresponding to the amount of charge generated by photoelectric conversion. The current signal is output from an output node (OUT) of each pixel. In the photoelectric conversion apparatus discussed in Japanese Patent Application Laid-Open No. 2013-146045, a digital signal corresponding to the amount of charge generated by photoelectric conversion is generated based on the current signal output from the output node of each pixel.

SUMMARY OF THE INVENTION

According to an aspect of the present invention, a photoelectric conversion apparatus includes a photoelectric conversion element, an amplification transistor including a gate configured to receive a signal based on a charge generated at the photoelectric conversion element, at least one transistor connected to the gate, a selection transistor provided in series with respect to the amplification transistor and forming a first path through which a current from the amplification transistor flows, a first current source configured to output a first reference current to a second path separated from the first path, a voltage control unit configured to control a voltage of a control line electrically connected to one of a source and a drain of the amplification transistor, and a comparison unit configured to compare the current from the amplification transistor with the first reference current, wherein the selection transistor is in a non-conductive state during a period in which the at least one transistor is in a conductive state.

Further features of the present invention will become apparent from the following description of exemplary embodiments with reference to the attached drawings.

BRIEF DESCRIPTION OF THE DRAWINGS

FIGS. 12A and 12B each illustrate a reading operation of a photoelectric conversion apparatus.

DESCRIPTION OF THE EMBODIMENTS

Some exemplary embodiments can increase the speed of driving a photoelectric conversion apparatus.

In a photoelectric conversion apparatus known by the present inventor and others, each pixel includes a transfer transistor, a reset transistor, and selection transistors. Further, during a period of reading current signals from each pixel, the selection transistor is constantly on. Therefore, a current output from a pixel may vary due to a change in a driving signal for driving the reset transistor or the transfer transistor. It takes time to settle a change in output current, so that it has been difficult to read signals at high speed. Various exemplary embodiments disclosed herein can increase the speed of driving a photoelectric conversion apparatus.

Figure 1:
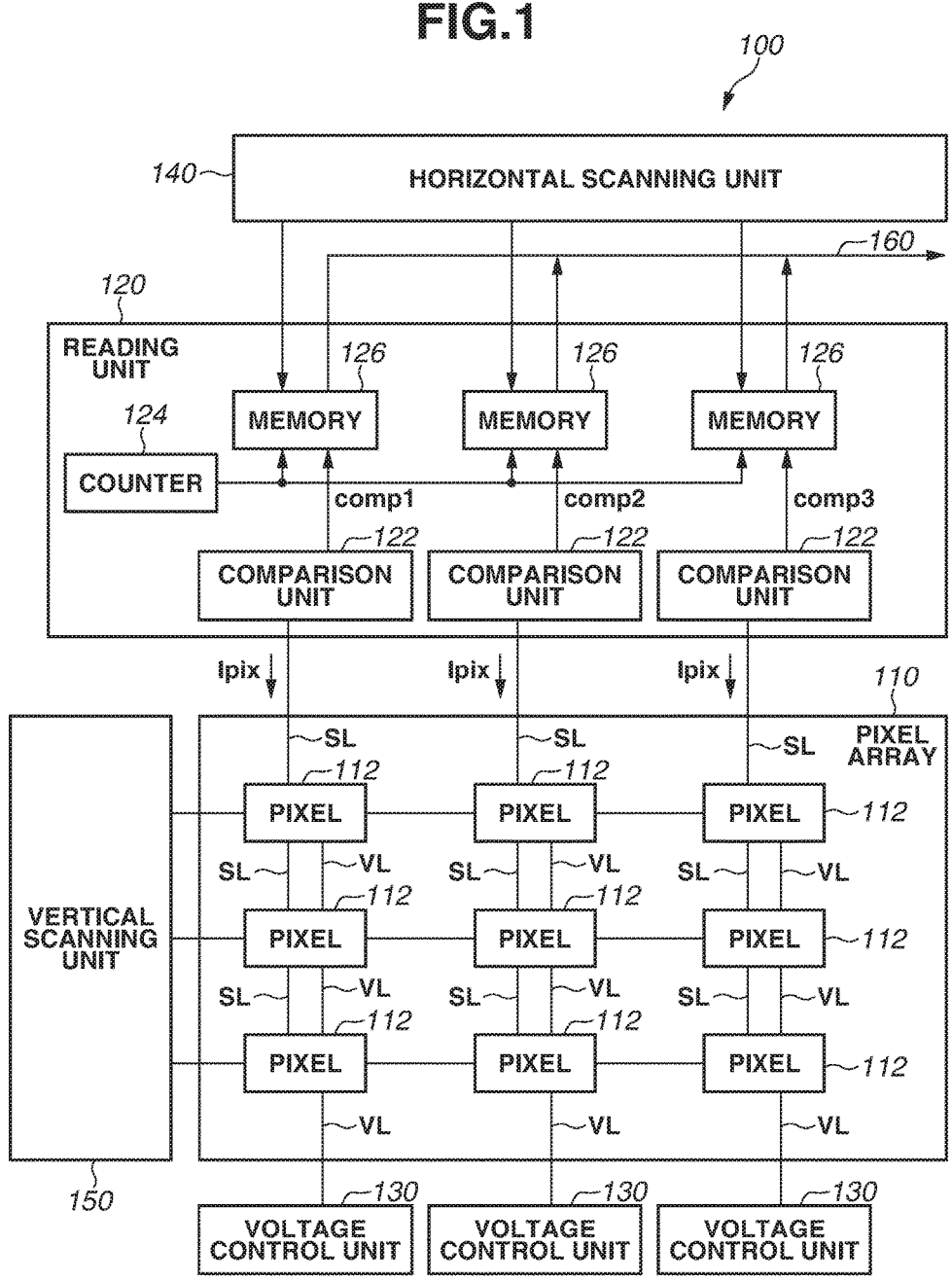
FIG. 1 illustrates a configuration of a photoelectric conversion apparatus.

FIG. 1 illustrates a configuration of a photoelectric conversion apparatus 100 according to a first exemplary embodiment of the present invention. The photoelectric conversion apparatus 100 includes at least one pixel 112. Typically, the photoelectric conversion apparatus 100 includes a pixel array 110 in which a plurality of pixels 112 is arranged one- or two-dimensionally. The photoelectric conversion apparatus 100 including the plurality of pixels 112 is used as an imaging apparatus. In the example illustrated in FIG. 1, the plurality of pixels 112 is arranged to form a plurality of rows and a plurality of columns, i.e., the plurality of pixels 112 is arranged two-dimensionally.

The photoelectric conversion apparatus 100 further includes a voltage control unit 130 and a reading unit 120. The voltage control unit 130 supplies a control voltage V_VL to a control line VL connected to the pixels 112. The reading unit 120 reads signals from the pixels 112 through sensing lines SL. One voltage control unit 130 and one reading unit 120 may be provided to each column of the pixel array 110.

The photoelectric conversion apparatus 100 further includes a vertical scanning unit (vertical selecting unit) 150 and a horizontal scanning unit (horizontal selecting unit) 140 for selecting a pixel 112 from which a signal is to be read. The vertical scanning unit 150 selects a predetermined row from a plurality of rows in the pixel array 110, and signals from the pixels 112 of the selected row are read by the reading unit 120 through the sensing lines SL. The horizontal scanning unit 140 selects a pixel 112 of a predetermined column from the pixels 112 of a plurality of columns read by the reading unit 120, and a digital signal of the selected pixel 112 is output to an output signal line 160. In this way, the horizontal scanning unit 140 selects a reading target column from the plurality of columns of the pixel array 110.

The voltage control unit 130 changes the voltage V_VL of the control line VL. At the time point at which the voltage V_VL of the control line VL is changed to a voltage corresponding to the amount of charge generated by photoelectric conversion, each of the pixels 112 of the row selected by the vertical scanning unit 150 forms a current path in the sensing line SL and causes a pixel current Ipix to flow. Based on the pixel current Ipix, the reading unit 120 generates a digital signal corresponding to the amount of charge generated by the photoelectric conversion.

The reading unit 120 includes a comparison unit (or comparator) 122, a counter 124, and a memory 126. The comparison unit 122 compares the pixel current Ipix with a reference current Iref. In the present exemplary embodiment, the comparison unit 122 detects that the value of the pixel current Ipix exceeds the value of the reference current Iref (threshold value). The counter 124 starts a counting operation at a predetermined timing. The memory 126 holds counted values of the counter 124 as digital signals corresponding to the signals of the pixels 112 according to changes in comparison result signals comp1, comp2, and comp3 of the comparison units 122. As used herein, "1," "2," and "3" in the comparison result signals comp1, comp2, and comp3 are identifiers for distinguishing from one another the comparison result signals comp of the plurality of comparison units 122 respectively corresponding to the plurality of columns of the pixel array 110.

Figure 2:
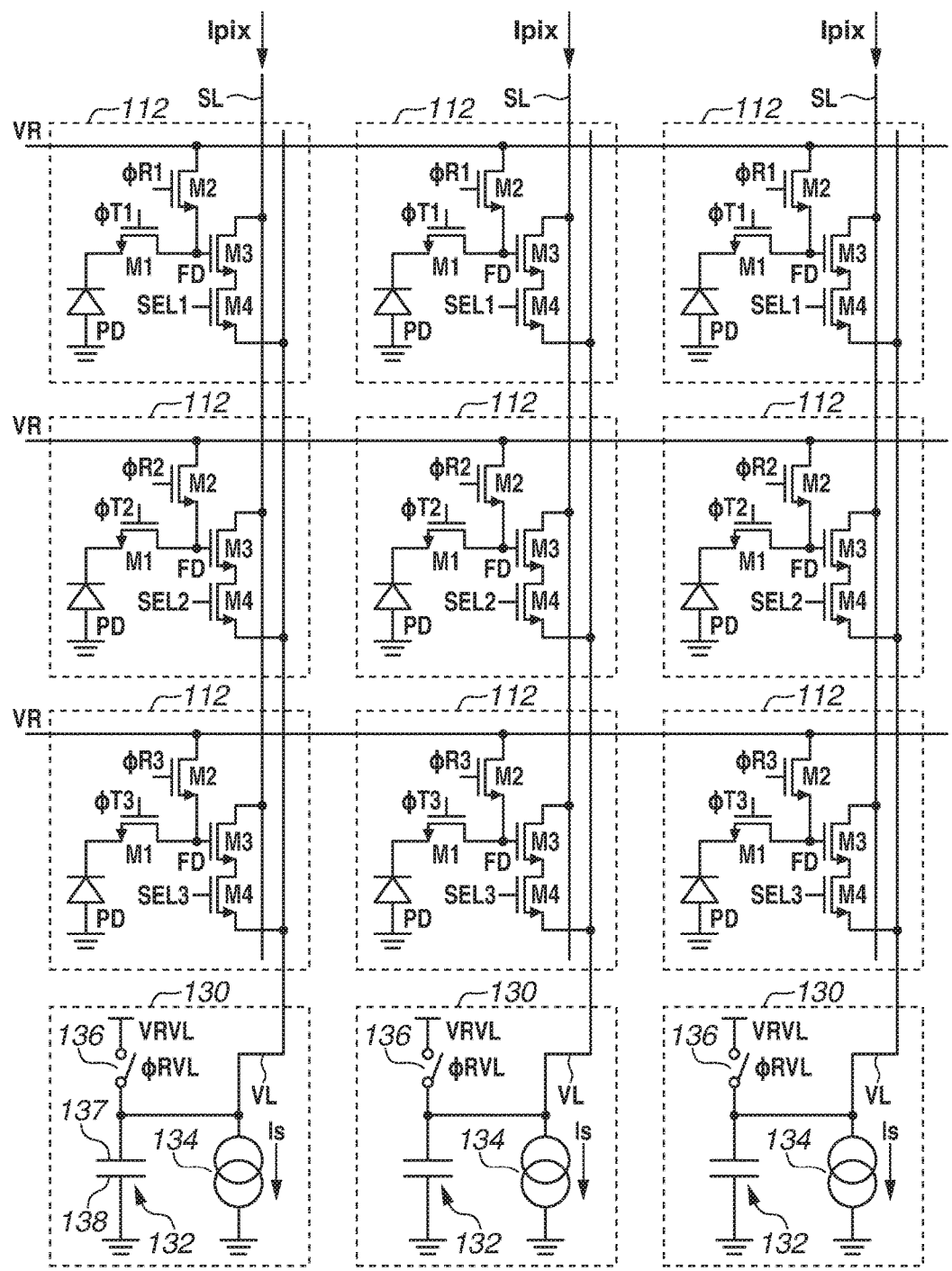
FIG. 2 illustrates an example of configurations of a pixel array and a voltage control unit.
Figure 3:
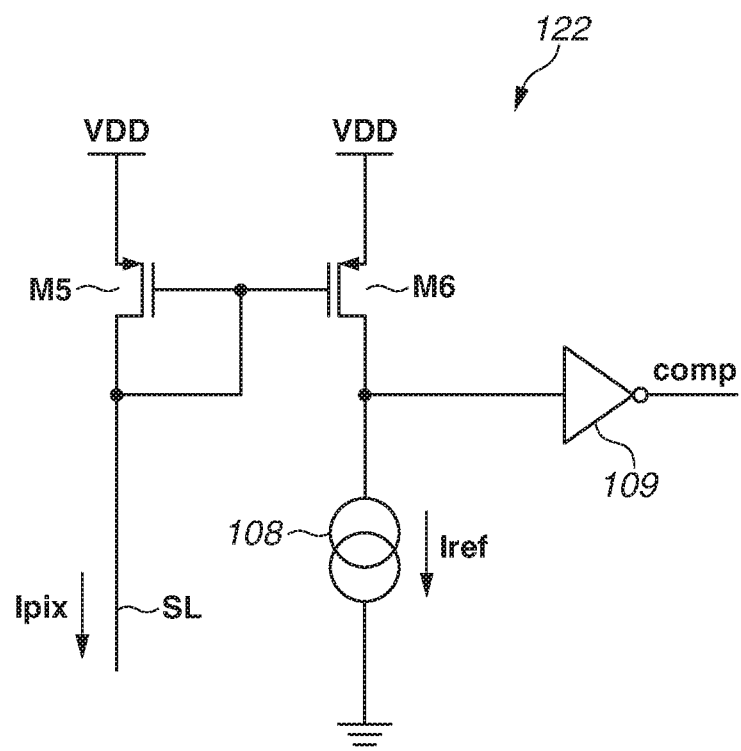
FIG. 3 illustrates an example of a configuration of a reading unit.

FIG. 2 illustrates an example of configurations of the pixel array 110 and the voltage control unit (or the voltage controller) 130. FIG. 3 illustrates an example of a configuration of the comparison unit 122 of the reading unit 120. The configuration and operations of the photoelectric conversion apparatus 100 will be described in more detail with reference to FIGS. 1 to 3.

Each of the pixels 112 includes at least a photoelectric conversion element PD, such as a photodiode, etc., and an amplification transistor M3. A gate of the amplification transistor M3 receives a signal based on a charge generated by the photoelectric conversion element PD. One of a source and a drain (source in this example) of the amplification transistor M3 is electrically connected to the control line VL. Each of the pixels 112 includes a charge-voltage conversion unit (floating diffusion) FD connected to the gate of the amplification transistor M3. Further, each of the pixels 112 includes at least one transistor connected to the gate of the amplification transistor M3. In the present exemplary embodiment, each of the pixels 112 includes a transfer transistor M1 connected to the gate of the amplification transistor M3. The transfer transistor M1 transfers a charge generated at the photoelectric conversion element PD to the gate of the amplification transistor M3. Further, each of the pixels 112 includes a reset transistor M2 connected to the gate of the amplification transistor M3. The reset transistor M2 resets the voltage of the gate of the amplification transistor M3. Each of the pixels 112 further includes a selection transistor M4. The selection transistor M4 is provided in a path between the amplification transistor M3 and the control line VL or a path between the amplification transistor M3 and the sensing line SL. In other words, the selection transistor M4 is arranged in series with respect to the amplification transistor M3 in the path of the current output from the amplification transistor M3. In the case where the selection transistor M4 is provided to the path between the amplification transistor M3 and the control line VL, the source of the amplification transistor M3 is electrically connected to the control line VL through the selection transistor M4.

Since the gate of the amplification transistor M3 and the charge-voltage conversion unit FD are connected to each other, they are of the same node. Thus, in the present specification, when the gate of the amplification transistor M3 and the charge-voltage conversion unit FD do not need to be distinguished from each other, the node will be referred to simply as the charge-voltage conversion unit FD.

The transfer transistor M1 is turned on in response to activation of a transfer signal ΦT (ΦT1, ΦT2, and ΦT3) by the vertical scanning unit 150, and transfers the charge of the photoelectric conversion element PD to the charge-voltage conversion unit FD. As used herein, "1," "2," and "3" in the transfer signals ΦT1, ΦT2, and ΦT3 are identifiers for distinguishing from one another the transfer signals ΦT corresponding to the plurality of rows of the pixel array 110. The reset transistor M2 is turned on in response to activation of a reset signal ΦR (ΦR1, ΦR2, ΦR3), and resets the voltage of the charge-voltage conversion unit FD to a voltage corresponding to a reset voltage VR supplied from a reset voltage line. As used herein, "1," "2," and "3" in the reset signals ΦR1, ΦR2, and ΦR3 are identifiers for distinguishing from one another the reset signals ΦR corresponding to the plurality of rows of the pixel array 110. The selection transistor M4 is turned on in response to activation of a selection signal SEL (SEL1, SEL2, and SEL3), and changes, to a selected state, the pixel 112 to which the selection signal SEL is connected. As used herein, "1," "2," and "3" in the selection signals SEL1, SEL2, and SEL3 are identifiers for distinguishing from one another the selection signals SEL corresponding to the plurality of rows of the pixel array 110.

A differential amplifier circuit as in the photoelectric conversion apparatus discussed in Japanese Patent Application Laid-Open No. 2013-146045 is not included in the pixel 112 according to the present exemplary embodiment. Thus, the pixel 112 according to the present exemplary embodiment of the present invention has a smaller circuit size than that of a pixel discussed in Japanese Patent Application Laid-Open No. 2013-146045 and is therefore advantageous in increasing the number of pixels.

The voltage V_VL of the control line VL is controlled by the voltage control unit 130. In the present exemplary embodiment, the voltage control unit 130 controls the voltage of the control line VL so that the voltage at the gate of the amplification transistor M3 becomes higher than that at the source (first main electrode) of the amplification transistor M3, i.e., the amplification transistor M3 is changed from an off state to an on state. In other words, in the present exemplary embodiment, the voltage control unit 130 drops the voltage V_VL of the control line VL.

The voltage control unit 130 includes a capacitor 132, a switch 136, and a current source 134. The capacitor 132 includes first and second terminals 137 and 138. The first terminal is connected to the control line VL. A predetermined voltage (ground voltage in this example) is supplied to the second terminal 138. The switch 136 is provided to a path between the control line VL and a first voltage node to which a first voltage VRVL is applied. The switch 136 resets the voltage of the first terminal 137 of the capacitor 132 and the voltage V_VL of the control line VL to a voltage based on the first voltage VRVL in response to activation of a reset signal ΦRVL. The current source 134 is provided between the control line VL and a second voltage node (ground node in this example) to which a second voltage (ground voltage in this example) is applied. In response to deactivation of the reset signal ΦRVL, the charge accumulated in the capacitor 132 is discharged at a current value Is through the current source 134. Consequently, the voltage V_VL of the control line VL is changed toward the voltage of the second voltage node. In the present exemplary embodiment, the voltage V_VL of the control line VL drops linearly.

The capacitor 132 is not limited to that additionally provided to the control line VL. The capacitor 132 may be substituted by a parasitic capacitance of the control line VL without changing the rest of the configuration.

The comparison unit 122 detects that the current Ipix flowing through the drain (second main electrode) of the amplification transistor M3 of the pixel 112 exceeds the value of the reference current Iref (threshold value). The comparison unit 122 includes transistors M5 and M6 such as p-type metal oxide semiconductor (PMOS) transistors that constitute a current mirror circuit. A gate and a drain of the transistor M5 are short-circuited with each other and connected to the sensing line SL. In this way, the transistor M5 constitutes a part of the path of the current from the amplification transistor M3. The transistor M6 is connected to the current source 108, which causes the reference current Iref to flow. In this way, the transistor M6 constitutes a part of the path of the reference current Iref output from the current source 108. The gate of the transistor M5 is connected to a gate of the transistor M6. A node between a drain of the transistor M6 and the current source 108 is an output node of the comparison unit 122. An inverter (inverting amplifier) 109 is connected to the output node of the comparison unit 122.

The reference current Iref flowed by the current source 108 defines a reference (threshold value) for the comparison in the comparison unit 122. The inverter (inverting amplifier) 109 outputs the comparison result signal comp. The memory 126 holds counted values of the counter 124 as digital signals corresponding to the signals of the pixels 112 according to changes in the comparison result signals comp1, comp2, and comp3 of the comparison unit 122. The inverter 109 is an example of an output circuit and may be substituted by other inverting amplifiers such as a source-grounded amplifier, etc.

With such a configuration, the reading unit 120 generates a digital signal corresponding to the voltage of the charge-voltage conversion unit FD of the pixel 112 at the timing at which the current value of the pixel current Ipix flowing from the amplification transistor M3 exceeds the current value (threshold value) of the reference current Iref.

In the present exemplary embodiment, the path (first path) of the current from the amplification transistor M3 and the path (second path) of the reference current Iref output from the current source 108 are separated from each other. The first path is from a power source node (VDD), to which a source of the transistor M5 is connected, to the second voltage node (ground node), to which the current source 134 is connected. The transistor M5, a part of the sensing line SL, the amplification transistor M3, the selection transistor M4, a part of the control line VL, and the current source 134 form the first path. The second path is from a power source node (VDD), to which a source of the transistor M6 is connected, to a ground node, to which the current source 108 is connected. The transistor M6, a part of the output node of the comparison unit 122, and the current source 108 form the second path. As described above, the first path and the second path share no portion. In other words, the first path and the second path are separated from each other. The first path and the second path, which are separated from each other, may share one of or both of a power source node and a ground node, because in general a power source node and a ground node are shared by a plurality of circuits.

Figure 4:
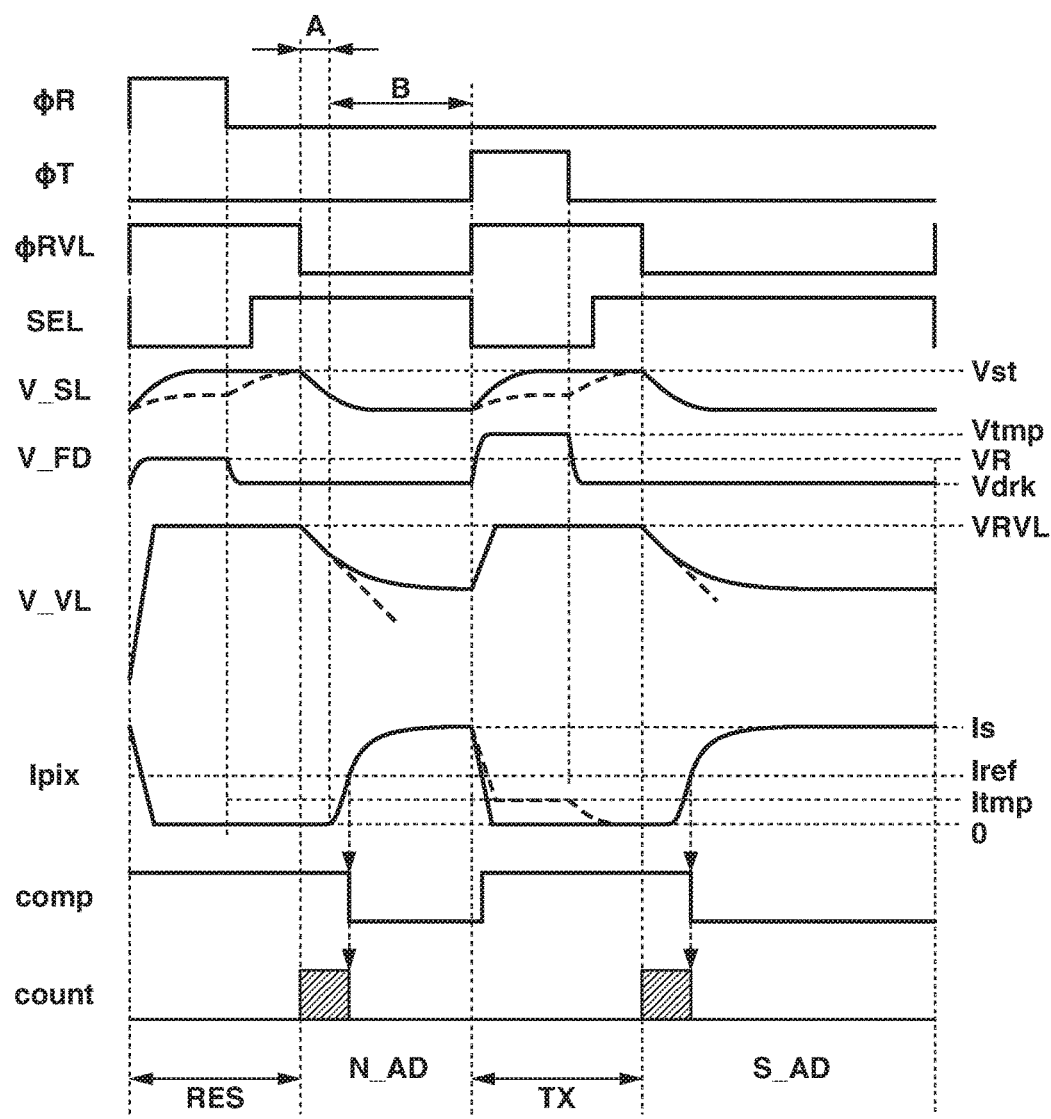
FIG. 4 illustrates a reading operation of signals from pixels.

FIG. 4 illustrates a reading operation of signals of a pixel 112 in the present exemplary embodiment. The reading operation includes a noise level reading operation N_AD and an optical signal level reading operation S_AD. The noise level reading operation N_AD is an operation of reading a signal corresponding to the voltage of the charge-voltage conversion unit FD as a digital signal after resetting the charge-voltage conversion unit FD. The optical signal level reading operation S_AD is an operation of reading a signal corresponding to the voltage of the charge-voltage conversion unit FD as a digital signal after transferring the charge of the photoelectric conversion element PD to the charge-voltage conversion unit FD.

First, the reset signal ΦR is activated for a predetermined time, so that the reset transistor M2 is turned on, i.e., the reset transistor M2 is changed to a conductive state. At this time point, a voltage V_FD of the charge-voltage conversion unit FD is reset to a voltage corresponding to the reset voltage VR through the reset transistor M2. For convenience, an example in which the voltage V_FD of the charge-voltage conversion unit FD at this time is equal to the reset voltage VR is illustrated in FIG. 4. The resetting of the voltage of the charge-voltage conversion unit FD is ended in response to deactivation of the reset signal ΦR.

In the present exemplary embodiment, the selection signal SEL is deactivated during the period in which the reset signal ΦR is activated. In other words, the selection transistor M4 is off, i.e., the selection transistor M4 is in a non-conductive state, during the period in which the reset transistor M2 is on.

In parallel with the resetting of the voltage of the charge-voltage conversion unit FD, the reset signal ΦRVL is activated for a predetermined time period. Consequently, the switch 136 is turned on, and the voltage V_VL of the control line VL is reset to a voltage corresponding to the first voltage VRVL through the switch 136. For convenience, an example in which the voltage V_VL of the control line VL at this time is equal to the first voltage VRVL is illustrated in FIG. 4. The voltage of the first terminal of the capacitor 132 connected to the control line VL is also reset to the voltage corresponding to the first voltage VRVL. The resetting of the voltage V_VL of the control line VL is ended in response to deactivation of the reset signal ΦRVL.

The first voltage VRVL (the voltage of the first voltage node) is defined in such a manner that a voltage set to the control line VL by turning on the switch 136 is a voltage that does not turn on the amplification transistor M3 of the pixel 112. In other words, the amplification transistor M3 is changed to the non-conductive state in response to the resetting of the voltage V_VL of the control line VL.

The noise level reading operation N_AD is started in response to deactivation of the reset signal ΦRVL. In response to the deactivation of the reset signal ΦRVL, the charge accumulated in the capacitor 132 is discharged at the current value Is by the current source 134, and the voltage V_VL of the control line VL drops linearly. The period in which the voltage V_VL of the control line VL drops linearly is indicated as a period A. Further, in response to deactivation of the reset signal ΦRVL, the counting operation by the counter 124 is started. The counting operation is indicated as "count" in FIG. 4.

When the voltage between the gate and the source of the amplification transistor M3 of the pixel 112 of the reading target row exceeds the threshold value of the amplification transistor M3, the period A ends, and moves to a period B. The voltage V_VL of the control line VL changes linearly in the period A and changes non-linearly in the period B. If the voltage between the gate and the source of the amplification transistor M3 of the pixel 112 of the reading target row exceeds the threshold value of the amplification transistor M3 as a result of a drop of the voltage V_VL of the control line VL to the voltage, the amplification transistor M3 is turned on, and the pixel current Ipix starts flowing. The pixel current Ipix flows into the control line VL through the amplification transistor M3 and the selection transistor M4. The value of the current that can flow in the control line VL is limited to the current value Is by the current source 134. Therefore, the flow of the pixel current Ipix leads to a decrease in the discharged current from the capacitor 132. Thus, the drop of the voltage V_VL of the control line VL changes non-linearly.

After the pixel current Ipix starts flowing, if the value of the pixel current Ipix exceeds the value of the reference current Iref (threshold value), it is detected by the comparison unit 122. More specifically, the comparison result signal comp is activated (inverted), and in response to the activation, the counted value counted by the counter 124 is stored as a digital signal indicating the noise level in a noise level storage memory of the memory 126. Thus, the reading unit 120 generates a digital signal corresponding to a time period from the time point at which the switch 136 is turned off after charging the capacitor 132 to the time point at which the value of the pixel current Ipix flowing through the drain of the amplification transistor M3 of the pixel 112 exceeds the value of the reference current Iref.

The noise level reading operation N_AD is ended after a sufficiently long time has been elapsed since the deactivation of the reset signal ΦRVL. Thereafter, the transfer signal ΦT is activated for a predetermined time. In response to the activation of the transfer signal ΦT1, the charge of the photoelectric conversion element PD is transferred to the charge-voltage conversion unit FD, whereby the voltage of the charge-voltage conversion unit FD is changed.

In the present exemplary embodiment, the selection signal SEL is deactivated during the period in which the transfer signal ΦT is activated. In other words, the selection transistor M4 is off, i.e., the selection transistor M4 is in the non-conductive state, during the period in which the transfer transistor M1 is on.

In parallel with the transfer of the charge, the reset signal ΦRVL is activated for a predetermined time period. In response to the activation of the reset signal ΦRVL, the period B ends. As a result of the activation of the reset signal ΦRVL for the predetermined time period, the switch 136 is turned on, and the voltage V_VL of the control line VL is reset to a voltage corresponding to the first voltage VRVL through the switch 136. The resetting of the voltage V_VL of the control line VL ends in response to deactivation of the reset signal ΦRVL.

The optical signal level reading operation S_AD is started in response to the deactivation of the reset signal ΦRVL. As a result of the deactivation of the reset signal ΦRVL, the charge accumulated in the capacitor 132 is discharged at the current value Is by the current source 134, and the voltage V_VL of the control line VL drops linearly. Subsequent operations are basically the same as those in the noise level reading operation N_AD, except that the reading time period in the reading operation S_AD is set longer than that in the reading operation N_AD.

If the voltage between the gate and the source of the amplification transistor M3 of the pixel 112 of the reading target row exceeds the threshold value of the amplification transistor M3 as a result of a drop of the voltage V_VL of the control line VL to the voltage, the amplification transistor M3 is turned on, and the pixel current Ipix starts flowing. After the pixel current Ipix starts flowing, if the value of the pixel current Ipix exceeds the value of the reference current Iref (threshold value), it is detected by the comparison unit 122 of the reading unit 120. Then, the comparison result signal comp is activated (inverted), and in response to the activation, the counted value counted by the counter 124 is stored as a digital signal indicating the optical signal level in an optical signal level storage memory of the memory 126. The reading unit 120 generates a digital signal corresponding to a time period from the time point at which the switch 136 is turned off after charging the capacitor 132, to the time point at which the value of the pixel current Ipix flowing through the drain of the amplification transistor M3 of the pixel 112 exceeds the value of the reference current Iref.

The digital signal indicating the noise level and the digital signal indicating the optical signal level that are stored in the memory 126 are output to the output signal line 160 in response to an instruction from the horizontal scanning unit 140. Both of the digital signal indicating the noise level and the digital signal indicating the optical signal level may be output from the photoelectric conversion apparatus 100, or a difference between the digital signal indicating the noise level and the digital signal indicating the optical signal level may be output from the photoelectric conversion apparatus 100.

Features of the photoelectric conversion apparatus 100 according to the present exemplary embodiment will be described in comparison with a common photoelectric conversion apparatus that includes an analog-to-digital (AD) converter. In the common photoelectric conversion apparatus, a signal of a pixel is output in the form of a voltage signal to a column signal line through an amplification transistor provided to the pixel, and the voltage signal is amplified by a column amplifier and then converted into a digital signal by the AD converter. In such a method, the AD conversion by the AD converter is to be started after the voltage of the column signal line is settled and the output of the column amplifier provided to each column of a pixel array 110 is also settled.

On the other hand, the photoelectric conversion apparatus 100 according to the present exemplary embodiment performs AD conversion in a broad sense of the term in the point of view that a signal corresponding to the voltage of the charge-voltage conversion unit FD is output as a digital signal. However, the photoelectric conversion apparatus 100 according to the present exemplary embodiment is not configured to read the voltage of the charge-voltage conversion unit FD as an analog voltage signal and then convert the analog voltage signal into a digital signal. In the photoelectric conversion apparatus 100 according to the present exemplary embodiment, the dropping of the voltage V_VL of the control line VL is started, and the AD conversion in a broad sense of the term is started simultaneously. Therefore, in the photoelectric conversion apparatus 100 according to the present exemplary embodiment, it is not necessary to wait until the voltage of the signal line is settled. Thus, the photoelectric conversion apparatus 100 according to the present exemplary embodiment is advantageous for reading signals from the pixel 112 at high speed.

In the present exemplary embodiment, each of the period in which the reset transistor M2 is in the conductive state and the period in which the transfer transistor M1 is in the conductive state includes a period in which the selection signal SEL is in the non-conductive state. This configuration makes it possible to increase the speed of the driving of the photoelectric conversion apparatus 100.

First, the period in which the voltage V_FD of the charge-voltage conversion unit FD is reset will be described. The reset signals ΦR and ΦRVL are activated, and the voltage of the charge-voltage conversion unit FD and the voltage of the control line VL are reset to the voltage based on the reset voltage VR and the voltage based on the first voltage VRVL, respectively. At this time, the voltage between the gate and the source of the amplification transistor M3 is expressed as "VR-VRVL".

In the case where the selection signal SEL is in the active state, in order to bring the amplification transistor M3 to the non-conductive state at this time point, the voltage (VR-VRVL) between the gate and the source of the amplification transistor M3 is smaller than the threshold voltage of the amplification transistor M3.

Next, in response to the deactivation of the reset signal ΦR, due to the coupling between the gate of the reset transistor M2 and the charge-voltage conversion unit FD, the voltage V_FD of the charge-voltage conversion unit FD is brought down from VR to Vdrk. The voltage between the gate and the source of the amplification transistor M3 is expressed as "Vdrk-VRVL", which is smaller than "VR-VRVL". Thus, the amplification transistor M3 is changed to a stronger off state. As a result, if the reset signal ΦRVL is deactivated and the AD conversion operation is started, it takes a longer time to turn on the amplification transistor M3.

In general, a capacitance CFD of the charge-voltage conversion unit FD is about ten times a coupling capacitance between the gate of the reset transistor M2 and the charge-voltage conversion unit FD, so that the difference between VR and Vdrk is about one tenth of the amplitude of the reset signal ΦR. For example, in a case where the amplitude of the reset signal ΦR is 5 V, the difference between VR and Vdrk is several hundred millivolts. The coupling capacitance may include a parasitic capacitance between the charge-voltage conversion unit FD and the writing for transmitting the reset signal ΦR in addition to the capacitance between the gate and the source of the reset transistor M2.

In the present exemplary embodiment, the selection signal SEL is deactivated during the period in which the reset transistor M2 is in the conductive state. Therefore, during the period, the path through which the current from the amplification transistor M3 flows is blocked. In other words, when the reset transistor M2 is in the conductive state, no current flows in the amplification transistor M3. Thus, during the period in which the reset transistor M2 is in the conductive state, the voltage (VR-VRVL) between the gate and the source of the amplification transistor M3 may be higher than the threshold voltage of the amplification transistor M3.

Then, after the reset signal ΦR is deactivated and the voltage V_FD of the charge-voltage conversion unit FD is brought down to Vdrk, the selection signal SEL is activated. At this time, the voltage (Vdrk-VRVL) between the gate and source of the amplification transistor M3 is to be lower than the threshold voltage of the amplification transistor M3.

Therefore, compared with the above-described case where the selection signal SEL is in the activate state, the first voltage VRVL can be set to a lower voltage. As a result, in the present exemplary embodiment, the time period, from the time point at which the reset signal ΦRVL is deactivated and the AD conversion operation is started to the time point at which the amplification transistor M3 is turned on, can be shortened. As a result, the speed of the driving of the photoelectric conversion apparatus 100 can be increased.

Next, the period in which the transfer transistor M1 is in the conductive state will be described. In parallel with the deactivation of the transfer signal ΦT to transfer the charge, the reset signal ΦRVL is activated to reset the control line VL. Due to the coupling between the charge-voltage conversion unit FD and the gate of the transfer transistor M1, the voltage V_FD of the charge-voltage conversion unit FD is brought up from Vdrk to Vtmp when the transfer signal ΦT is activated.

As a result of bringing up the voltage V_FD of the charge-voltage conversion unit FD, the amplification transistor M3 may be possibly turned on. Therefore, in a case where the selection transistor M4 remains in the conductive state at the time of the transfer of the charge, a high voltage is used as the first voltage VRVL. This increases the time period from the time point at which the reset signal ΦRVL is deactivated and the AD conversion operation is started, to the time point at which the amplification transistor M3 is turned on.

Further, if the amplification transistor M3 is turned on as a result of bringing up the voltage V_FD of the charge-voltage conversion unit FD, a current Itmp flows into the amplification transistor M3 as indicated by a dotted line in FIG. 4. Further, the voltage V_SL of the sensing line SL drops from a potential Vst, which is an initial voltage for the start of the AD conversion operation, to a voltage corresponding to the current Itmp. Thereafter, the transfer signal ΦT is deactivated, and the potential of the charge-voltage conversion unit FD is recovered to Vdrk. Consequently, the amplification transistor M3 is turned off to cause the flow of the current to stop, and the sensing line SL is settled to the potential Vst. Thus, it takes time for the voltage V_SL of the sensing line SL to settle.

In the present exemplary embodiment, the selection signal SEL is deactivated during the period in which the transfer transistor M1 is in the conductive state. Thus, during the period, the path through which the current from the amplification transistor M3 flows is blocked. In other words, when the transfer transistor M1 is in the conductive state, no current flows in the amplification transistor M3. Therefore, during the period in which the transfer transistor M1 is in the conductive state, the voltage (VR-VRVL) between the gate and the source of the amplification transistor M3 may be higher than the threshold voltage of the amplification transistor M3.

Then, after the transfer signal ΦT is deactivated and the voltage V_FD of the charge-voltage conversion unit FD is brought down to Vdrk, the selection signal SEL is activated. At this time, the voltage (Vdrk-VRVL) between the gate and the source of the amplification transistor M3 is to be lower than the threshold voltage of the amplification transistor M3.

Thus, compared with the above-described case where the selection signal SEL is in the activate state, the first voltage VRVL can be set to a lower voltage. Therefore, in the present exemplary embodiment, the time period, from the time point at which the reset signal ΦRVL is deactivated and the AD conversion operation is started to the time point at which the amplification transistor M3 is turned on, can be shortened.

As a result, the speed of the driving of the photoelectric conversion apparatus 100 can be increased.

Further, if the amplification transistor M3 is not turned on, the voltage V_SL of the sensing line SL is settled at Vst. Thus, in the present exemplary embodiment, the selection signal SEL is deactivated during a period TX to enable faster settlement of the voltage of the sensing line SL, whereby the speed of the reading can be increased.

In general, the size (channel width) of the transfer transistor M1 is larger than the size (channel width) of the reset transistor M2. Thus, the difference between Vtmp and Vdrk can be larger than the difference between VR and Vdrk. Therefore, the speed increase effect is more significant in the case where the selection transistor M4 is off during the period in which the transfer transistor M1 is on than in the case of the reset transistor M2. The coupling capacitance in this case may include a parasitic capacitance between the charge-voltage conversion unit FD and the wiring for supplying the transfer signal ΦT in addition to a capacitance between the gate and the drain of the transfer transistor M1.

In the driving illustrated in FIG. 4, the rise of the reset signal ΦR and the drop of the selection signal SEL occur at the same time. However, the speed increase effect can be obtained if the selection signal SEL is deactivated during at least a part of the period during which the reset signal ΦR is activated. If the selection signal SEL is deactivated when the reset signal ΦR is changed from the non-active state to the active state, the influence of the change in the state of the reset signal ΦR can be decreased to increase the speed increase effect. If the period during which the selection signal SEL is deactivated includes a period during which the reset signal ΦR is activated, a more significant speed increase effect can be obtained. In one embodiment, the period during which the reset signal ΦRVL is activated includes a period during which the selection signal SEL is deactivated.

Further, in the driving illustrated in FIG. 4, the rise of the transfer signal ΦT and the drop of the selection signal SEL occur at the same time. However, the speed increase effect can be obtained if the selection signal SEL is deactivated during at least a part of the period during which the transfer signal ΦT is activated. If the selection signal SEL is deactivated when the transfer signal ΦR is changed from the non-active state to the active state, the influence of the change in the state of the transfer signal ΦR can be decreased to increase the speed increase effect. If the period during which the selection signal SEL is deactivated includes a period during which the transfer signal ΦT is activated, a more significant speed increase effect can be obtained. In another embodiment, the period during which the reset signal ΦRVL is activated includes a period during which the selection signal SEL is deactivated.

In the example illustrated in FIG. 4, each of the period during which the reset transistor M2 is in the conductive state and the period during which the transfer transistor M1 is in the conductive state includes a period during which the selection signal SEL is in the non-conductive state in the present exemplary embodiment. However, the configuration is not limited to such a configuration. In the photoelectric conversion apparatus 100 in which the pixel 112 includes both the transfer transistor M1 and the reset transistor M2, only the period during which the reset transistor M2 is in the conductive state may include a period during which the selection signal SEL is in the non-conductive state. Further, in the photoelectric conversion apparatus 100 in which the pixel 112 includes both the transfer transistor M1 and the reset transistor M2, only the period during which the transfer transistor M1 is in the conductive state may include a period during which the selection signal SEL is in the non-conductive state. These exemplary embodiments will be described below with reference to FIGS. 5 and 6.

Figure 5:
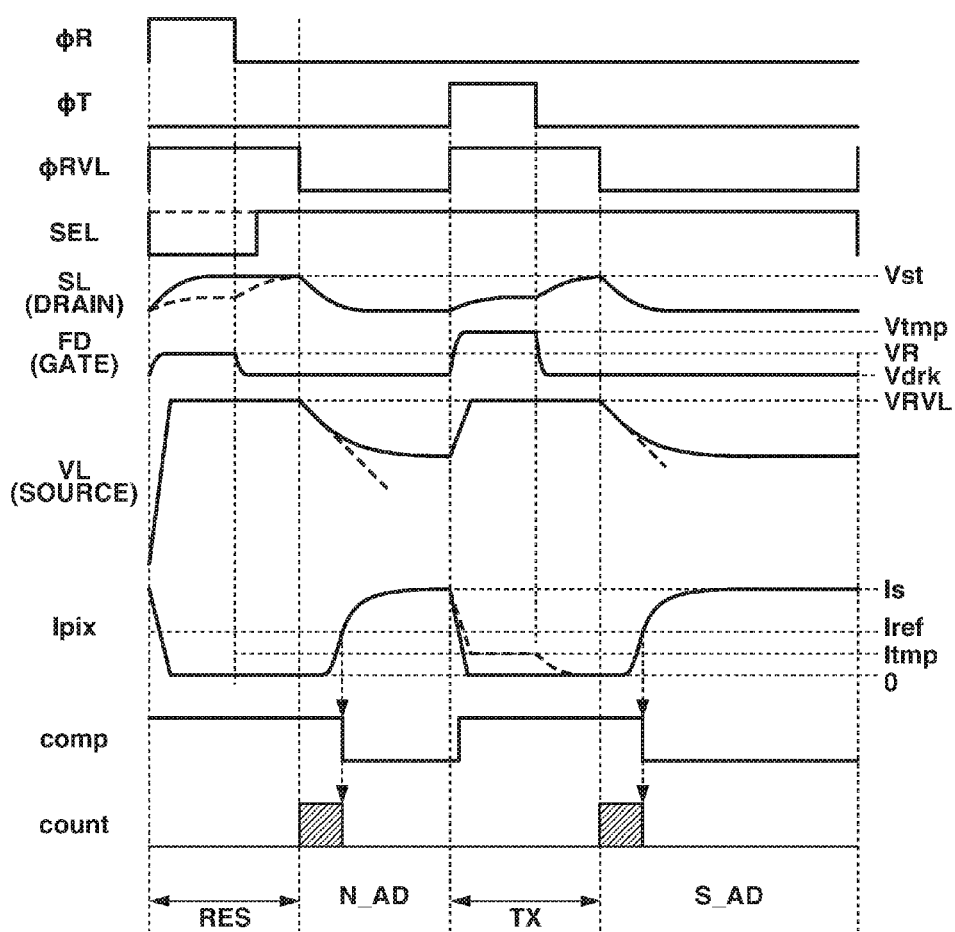
FIG. 5 illustrates a reading operation of signals from pixels.

FIG. 5 illustrates a reading operation of signals from the pixel 112 in the present exemplary embodiment. The reading operation includes a noise level reading operation N_AD and an optical signal level reading operation S_AD. The operation illustrated in FIG. 5 is different from the operation illustrated in FIG. 4 in that the selection transistor M4 is constantly on when the transfer transistor M1 is in the conductive state. The rest of the operation is similar to that illustrated in FIG. 4, so that description thereof is omitted.

The operation illustrated in FIG. 5 can reduce the time required for the noise level reading operation N_AD. Therefore, the speed of the driving of the photoelectric conversion apparatus 100 can be increased.

In another exemplary embodiment, the present exemplary embodiment is modified so that the pixel 112 of the photoelectric conversion apparatus does not include the transfer transistor M1. In other words, the photoelectric conversion element PD is connected directly to the gate of the amplification transistor M3. In this exemplary embodiment, the reading operation illustrated in FIG. 5 is conducted. However, the transfer signal ΦT is not used. Further, only the optical signal level reading operation S_AD may be conducted in the reading operation. In this exemplary embodiment, the time required for the reading operation S_AD can be reduced, so that the speed of the driving of the photoelectric conversion apparatus can be increased.

Figure 6:
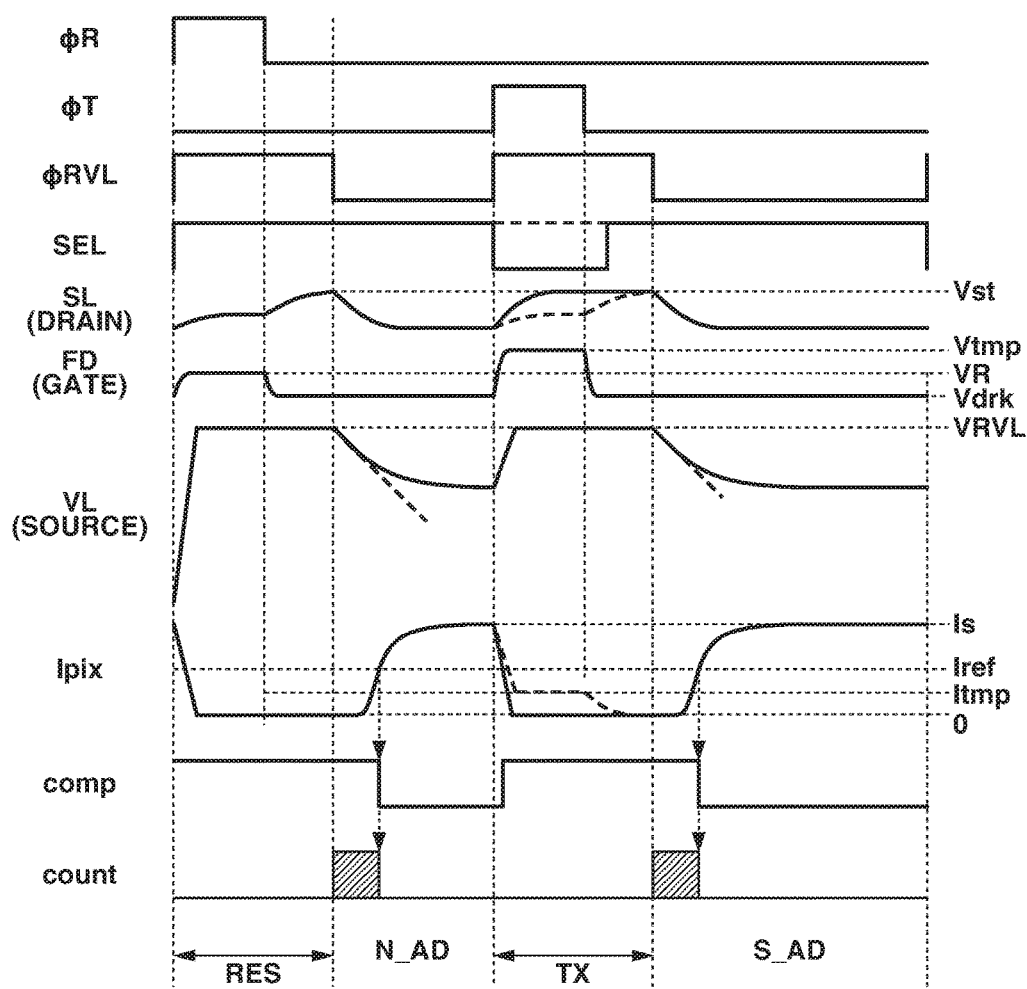
FIG. 6 illustrates a reading operation of signals from pixels.

FIG. 6 illustrates a reading operation of signals of the pixel 112 in the present exemplary embodiment. The reading operation includes a noise level reading operation N_AD and an optical signal level reading operation S_AD. The reading operation illustrated in FIG. 6 is different from the operation illustrated in FIG. 4 in that the selection transistor M4 is constantly on when the reset transistor M2 is in the conductive state. The rest of the operation is similar to that illustrated in FIG. 4, so that the description thereof is omitted.

The operation illustrated in FIG. 6 can reduce the time required for the optical signal level reading operation S_AD. As a result, the speed of the driving of the photoelectric conversion apparatus 100 can be increased.

In yet another exemplary embodiment, the present exemplary embodiment is modified so that the pixel 112 of the photoelectric conversion apparatus does not include the reset transistor M2. For example, in a case where a current generated at the photoelectric conversion element PD is output as an optical current from the amplification transistor M3, the reset transistor M2 is not used. In this exemplary embodiment, the reading operation illustrated in FIG. 6 is conducted. However, the reset signal ΦR is not used. Further, only the optical signal level reading operation S_AD may be conducted in the reading operation. In this exemplary embodiment, the time required for the reading operation S_AD can be reduced, so that the speed of the driving of the photoelectric conversion apparatus can be increased.

Further, in the present exemplary embodiment, the transfer transistor M1 and the reset transistor M2 are described as examples of transistors connected to the gate of the amplification transistor M3. However, the transistors connected to the gate of the amplification transistor M3 are not limited to the transfer transistor M1 and the reset transistor M2. Other examples include transistors for connecting the charge-voltage conversion units FD of the plurality of pixels 112 to one another and transistors for changing the capacitance of the charge-voltage conversion unit FD. The selection transistor M4 is set to be in the non-conductive state during the period in which the transistors connected to the gate of the amplification transistor M3 are in the conductive state, whereby the speed increase effect can be obtained.

In each of the exemplary embodiments described above, a plurality of pixels may share the amplification transistor M3. In other words, a plurality of photoelectric conversion elements may be connected to a shared floating diffusion through different transfer transistors.

Figure 7:
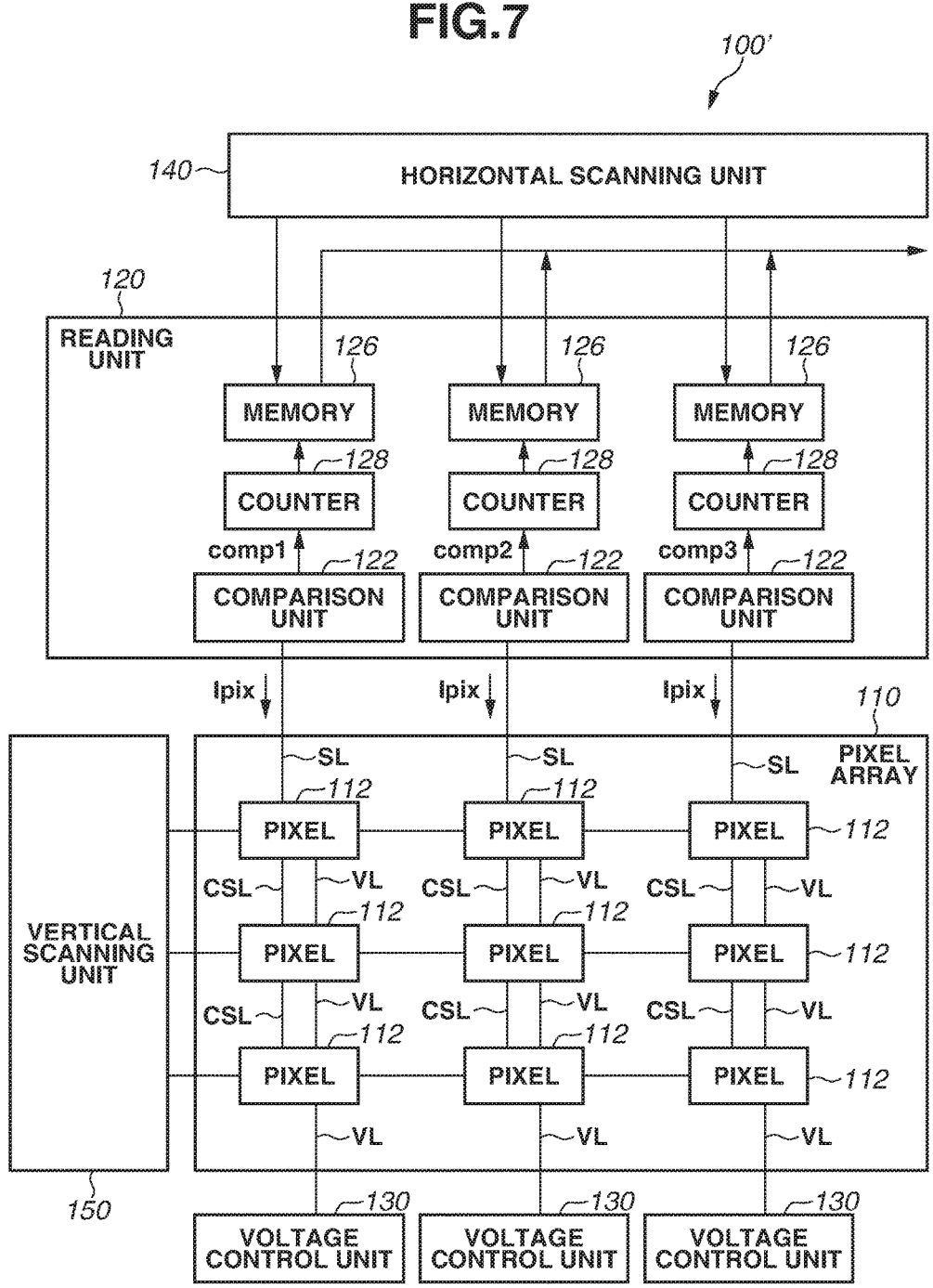
FIG. 7 illustrates a configuration of a photoelectric conversion apparatus.

FIG. 7 illustrates a configuration of a photoelectric conversion apparatus 100' according to a second exemplary embodiment of the present invention. Items that are not referred to in the present exemplary embodiment are similar to those in the first exemplary embodiment. A difference between the present exemplary embodiment and the first exemplary embodiment is the configuration of a reading unit 120. More specifically, a counter 128 is provided to each column. Therefore, the reading unit 120 includes one comparison unit 122, one counter 128, and one memory 126 for each column of a pixel array 110. The counter 128 stops the counting operation in response to a change in a comparison result signal comp from the corresponding comparison unit 122, and a memory 126 stores a counted value counted by the corresponding counter 128.

In the photoelectric conversion apparatus 100' according to the present exemplary embodiment, the reading operation of signals from pixels that is illustrated in one of FIGS. 4 to 6 is conducted. As a result, the speed of the driving of the photoelectric conversion apparatus 100' can be increased.

Figure 8:
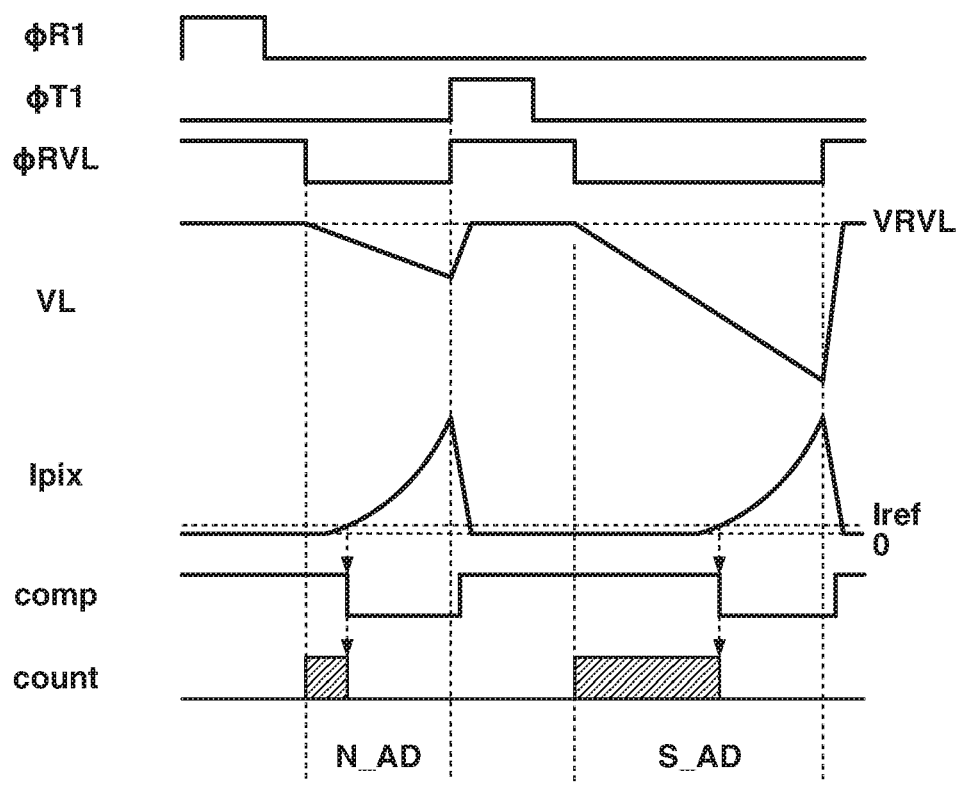
FIG. 8 illustrates a reading operation of signals from pixels.

FIG. 8 illustrates a reading operation of signals from a pixel 112 according to a third exemplary embodiment of the present invention. Items that are not referred to in the present exemplary embodiment are similar to those in the first or second exemplary embodiment. In the present exemplary embodiment, a voltage control unit 130 includes a variable voltage source, and a voltage VL_V of a control line VL is controlled by the variable voltage source. More specifically, the voltage control unit 130 causes the voltage VL_V of the control line VL to drop linearly in response to deactivation of a reset signal ΦRVL. A current Ipix, which flows through the amplification transistor M3, starts flowing at the same time as the amplification transistor M3 starts changing to the on state, and the current Ipix continues increasing until the voltage VL_V of the control line VL stops changing. A buffer such as a voltage follower, etc. is one of the possible examples of the voltage control unit 130 for linearly changing the voltage VL_V of the control line VL as described above. For example, in FIG. 2, the voltage of the node to which the constant current source and the first terminal 137 of the capacitor 132 are connected is supplied to the control line VL through the voltage follower.

The voltage of the control line VL may be controlled in the direction in which the amplification transistor M3 is changed from the on state to the off state. In the case where the voltage of the control line VL is controlled in the direction in which the amplification transistor M3 is changed from the on state to the off state in this way, when the value of the pixel current Ipix becomes smaller than the value of a reference current Iref, it can also be referred to as exceeding a threshold value. Detecting that the value of the pixel current Ipix becomes smaller than the value of the reference current Iref is also included in the comparison of the pixel current Ipix with the reference current Iref.

While a selection signal SEL is not illustrated in FIG. 8, the selection signal SEL illustrated in one of FIGS. 4 to 6 can be used in the present exemplary embodiment. As a result, the speed of the driving of the photoelectric conversion apparatus can be increased.

Figure 9A:
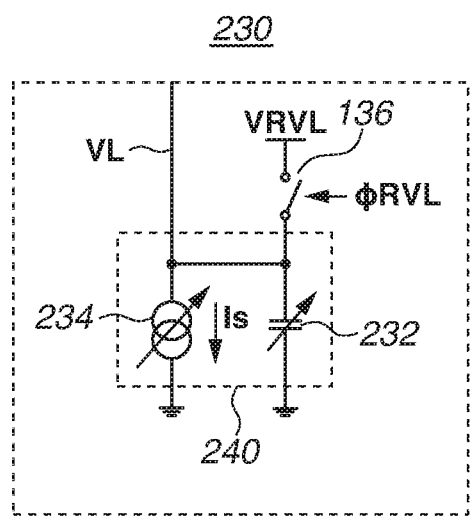
FIGS. 9A and 9B each illustrate a configuration of a voltage control unit of a photoelectric conversion apparatus.

A photoelectric conversion apparatus according to a fourth exemplary embodiment of the present invention will be described with reference to FIG. 9A. The present exemplary embodiment is different from the first to third exemplary embodiments in that the voltage control unit 130 is replaced by a voltage control unit 230. Items that are not referred to in the present exemplary embodiment are similar to those in one of the first to third exemplary embodiments.

The voltage control unit 230 changes a voltage V_VL of a control line VL. The voltage control unit 230 includes a variable capacitor 232, a switch 136, and a variable current source 234. The variable capacitor 232 and the variable current source 234 constitute a gain control unit 240. The gain control unit 240 can determine a capacitance value of the variable capacitor 232 and a current value Is of a current output from the variable current source 234 according to a control signal (not illustrated).

If the capacitance value of the variable capacitor 232 is increased, a change (gradient) in the voltage V_VL of the control line VL during a period A can be decreased. If the capacitance value of the variable capacitor 232 is decreased, a change (gradient) in the voltage V_VL of the control line VL during the period A can be increased. Further, if the current value Is is increased, the discharged current from the variable capacitor 232 is increased during the period A in FIG. 4, whereby a change (gradient) in the voltage V_VL of the control line VL can be increased. If the current value Is is decreased, a change (gradient) in the voltage V_VL of the control line VL during the period A can be decreased.

As described above, with the gain control unit 240, the amount of change (gradient) in the voltage V_VL of the control line VL per unit time in the period A can be changed. In this way, the AD conversion gain (the gain of the reading of the reading unit 120) can be switched as described below. While both of the capacitance value of the variable capacitor 232 and the current value Is of the variable current source 234 are variable in this example, the AD conversion gain can be changed even if only one of the capacitance value of the variable capacitor 232 and the current value Is of the variable current source 234 may be variable.

Figure 10:
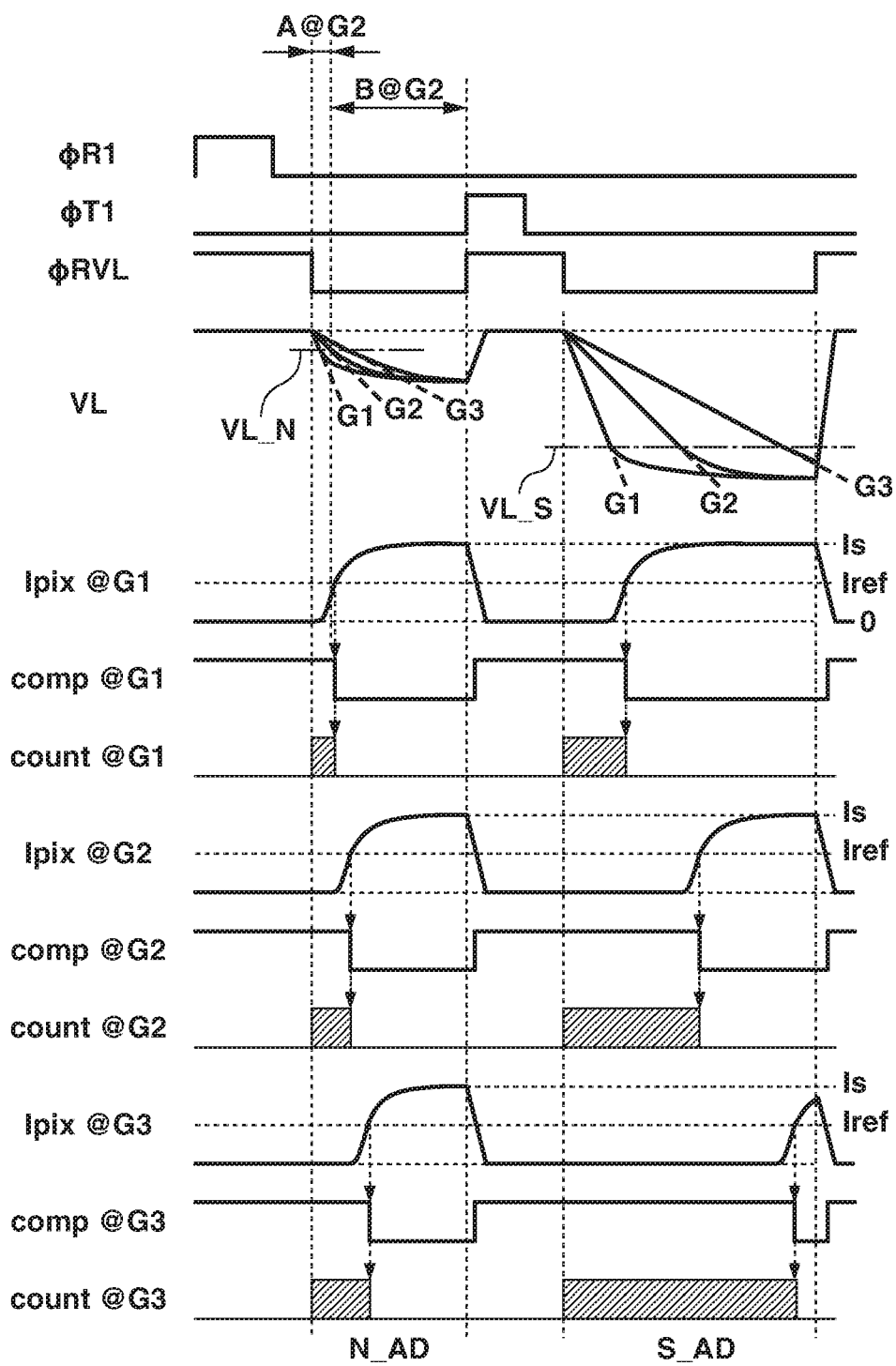
FIG. 10 illustrates a reading operation of signals from pixels.

The switching of an AD conversion gain in the photoelectric conversion apparatus according to the present exemplary embodiment will be described with reference to FIG. 10. FIG. 10 illustrates three AD conversion gains G1, G2, and G3. The AD conversion gain that is the same as that in FIG. 4 is referred to as the gain G2. The AD conversion gain of a case where the gradient of the control line VL is set larger than that of the gain G2 is referred to as the gain G1. The AD conversion gain of a case where the gradient of the control line VL is set smaller than that of the gain G2 is referred to as the gain G3. As described above, the AD conversion gain can be determined by changing at least one of the capacitance values of the variable capacitor 232 and the current value Is. The reset voltage for the charge-voltage conversion unit FD and the amount of charge transferred from the photoelectric conversion element PD to the charge-voltage conversion unit FD in response to activation of the transfer signal ΦT are the same in all of the AD conversion gains. In FIG. 10, a selection signal SEL is not illustrated. The selection signal SEL illustrated in one of FIGS. 4 to 6 can be used.

First, a reset signal ΦR1 is activated for a predetermined time period to turn on a reset transistor M2, and the voltage of the charge-voltage conversion unit FD is reset to a voltage corresponding to a reset voltage VR through the reset transistor M2. The resetting of the voltage of the charge-voltage conversion unit FD ends in response to deactivation of the reset signal ΦR1. In parallel with the resetting of the voltage of the charge-voltage conversion unit FD, a reset signal ΦRVL is activated for a predetermined time period to turn on the switch 136 and reset the voltage V_VL of the control line VL to a voltage corresponding to a first voltage VRVL through the switch 136. Similarly, the voltage of a first terminal 137 of the variable capacitor 232 connected to the control line VL is reset to a voltage corresponding to the first voltage VRVL. The resetting of the voltage V_VL of the control line VL ends in response to deactivation of the reset signal ΦRVL. The first voltage VRVL (the voltage of the first voltage node) is defined so that a voltage set to the control line VL by turning on the switch 136 is a voltage that does not turn on an amplification transistor M3 of a pixel 112.

In response to deactivation of the reset signal ΦRVL, a noise level reading operation N_AD is started, and the voltage V_VL of the control line VL drops with a gradient corresponding to the setting of the AD conversion gain G1, G2, or G3. Regardless of which one of the AD conversion gains G1, G2, and G3 is selected, the voltage of the charge-voltage conversion unit FD is the same, so that at the time point at which the voltage V_VL of the control line VL becomes a voltage VL_N, the amplification transistor M3 is turned on, and the pixel current Ipix starts flowing. The AD conversion gain G1 has the largest gradient, so that the pixel current Ipix starts flowing at an earliest time point. On the other hand, in the case of the AD conversion gain G3 having the smallest gradient, the pixel current Ipix starts flowing at a latest time point. Ipix@G1, comp@G1, and count@G1 respectively indicate Ipix, comp, and count of the case where the AD conversion gain is G1. Similarly, Ipix@G2, comp@G2, and count@G2 respectively indicate Ipix, comp, and count of the case where the AD conversion gain is G2. Similarly, Ipix@G3, comp@G3, and count@G3 respectively indicate Ipix, comp, and count of the case where the AD conversion gain is G3.

Similarly, in the optical signal level reading operation S_AD, the pixel current Ipix starts flowing at the time point at which the voltage V_VL of the control line VL becomes VL_S. In this case, the pixel current Ipix starts flowing at an earliest time in the case of the AD conversion gain G1 and at a latest time in the case of the AD conversion gain G3. At each time and each gain, the comparison result signal comp is inverted at the timing at which the value of the pixel current Ipix exceeds the value of the reference current Iref, and a digital signal that is the counted value at that time point is stored in the memory 126.

The counted value is stored at the earliest time in the case of the AD conversion gain G1, meaning that the value of the digital value in the case of the AD conversion gain G1 is the smallest value. Further, the counted value is stored at the latest time in the case of the AD conversion gain G3, meaning that the value of the digital signal in the case of the AD conversion gain G3 is the largest value. When the AD conversion gain is defined as (the value of the digital signal)/(the voltage level of the charge-voltage conversion unit), the relationship between the AD conversion gain and the gradient of a voltage V_BL of the control line VL is as follows: G1 (gain: small, gradient: large)<G2 (gain: medium, gradient: medium)<G3 (gain: large, gradient: small).

Thus, the gain control unit 240 provides a function of switching the AD conversion gain of the reading unit 120.

Figure 9B:
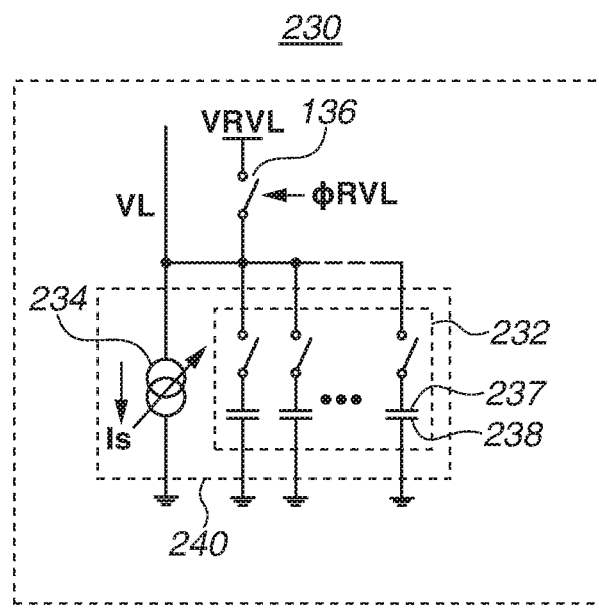

FIG. 9B illustrates a specific example of the configuration of the gain control unit 240. In the example illustrated in FIG. 9B, the variable capacitor 232 includes a plurality of units connected in parallel, and each of the units includes a capacitor and a selection switch connected in series. The capacitance value of the variable capacitor 232 can be determined by controlling the state (on, off) of the selection switch. In other words, a capacitor to be used to control the voltage of the control line VL can be selected from the plurality of capacitors by controlling the state (on, off) of the selection switch.

In a case where the capacitor of each unit includes a device using a silicon diffusion layer such as a metal oxide semiconductor (MOS) type capacitor, a parasitic capacitance between a diffusion layer and a well is generated in one of two electrodes 237 and 238 of the capacitor. In a case where each capacitor is disposed between the switch and the control line VL, regardless of the state of the switch, the parasitic capacitances of all of the capacitors are added to the control line VL. In this case, a desired gain may not be obtained at the time of setting the AD conversion gain in the gain control unit 240. Thus, as in the example illustrated in FIG. 9B, the switch is inserted between the capacitor and the control line VL so that the parasitic capacitance of the capacitor to which the switch that is off is connected is also separated from the control line VL. Accordingly, with such a configuration, an error component originating from the parasitic capacitances can be decreased to enable more accurate setting of the AD conversion gain.

Further, in the present exemplary embodiment, the selection signal SEL illustrated in one of FIGS. 4 to 6 can be used. As a result, the speed of the driving of the photoelectric conversion apparatus 100 can be increased.

Figure 11:
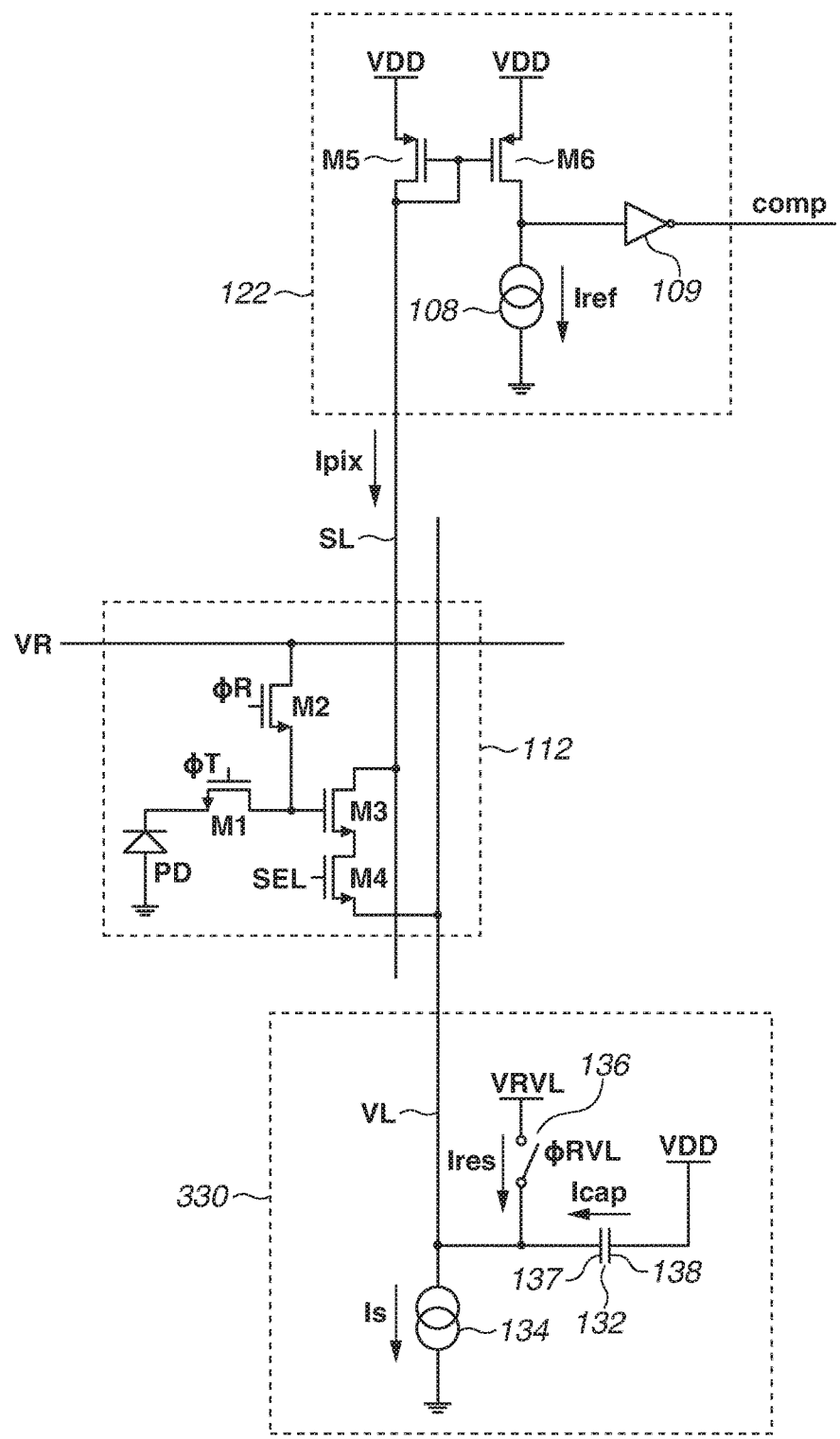
FIG. 11 illustrates a configuration of a photoelectric conversion apparatus.

A photoelectric conversion apparatus according to a fifth exemplary embodiment of the present invention will be described with reference to FIG. 11. Items that are not referred to in the present exemplary embodiment are similar to those in one of the first to fourth exemplary embodiments. In FIG. 11, for simplification, a comparison unit 122 and a voltage control unit 330 for one column and one pixel 112 of the column are representatively illustrated. In the present exemplary embodiment, the voltage control unit 130 is replaced by the voltage control unit 330.

The voltage control unit 330 is different from the voltage control unit 130 in that a second terminal 138 of a capacitor 132 is connected to a third voltage node (in this example, a power source node that supplies a power source voltage VDD). In the present exemplary embodiment, the voltage of the third voltage node is the same as a power source voltage VDD supplied to sources of transistors M5 and M6 of the comparison unit 122. While the voltage control unit 330 illustrated in FIG. 11 does not have the function of changing the AD conversion gain, the voltage control unit 330 may have the function of changing the AD conversion gain as in the fourth exemplary embodiment.

FIG. 12A illustrates an operation performed in the configuration in which the second terminal 138 of the capacitor 132 is connected to a second voltage node (ground node) as in the first to fourth exemplary embodiments. FIG. 12B illustrates an operation according to the present exemplary embodiment, i.e., an operation performed in the configuration in which the second terminal 138 is connected to the third voltage node (in this example, the power source node that supplies the power source voltage VDD). In FIGS. 12A and 12B, a selection signal SEL is not illustrated. The selection signal SEL illustrated in one of FIGS. 4 to 6 can be used.

A current flowing from the capacitor 132 is denoted by Icap, and a current flowing in the switch 136 is denoted by Ires. The direction of the flow of the current Icap from the second terminal 138 of the capacitor 132 to a first terminal 137 is defined as a positive current. Basic operations of waveforms in a noise level reading operation N_AD are similar to those in an optical signal level reading operation S_AD, so that only S_AD is illustrated.

In FIG. 12A, a current Ivdd supplied from the third voltage node is the sum of a pixel current Ipix and a reference current Iref. The current Icap is a discharged current from the capacitor 132 after the deactivation of ΦRVL and is supplied from the second voltage node (ground node) through the second terminal 138. Thus, a current Ignd flowing into the second voltage node is a value obtained by subtracting Icap from the sum of the current source current Is and Iref. As apparent from FIG. 12A, it can be understood that Ivdd and Ignd fluctuate significantly during a period of S_AD in which the AD conversion is conducted. The second and third voltage nodes have reasonable impedances, so that the fluctuations in the currents cause fluctuations in the ground voltage and the power source voltage. While only the circuit of one column is illustrated in FIG. 11, in a case of a photoelectric conversion apparatus including a plurality of columns, fluctuations in the ground voltage and the power source voltage that are caused by other columns while a column is subjected to the AD conversion become a noise factor.

In the case illustrated in FIG. 12B, the second terminal 138 of the capacitor 132 is connected to the third voltage node, so that Ivdd is the sum of Ipix, Iref, and Icap, and Ignd is the sum of Is and Iref. Icap and Ipix are in a reversed phase relationship, so that the fluctuations in the currents can be cancelled by adding Icap and Ipix together, whereby the fluctuation in Ivdd can be prevented. Further, Ignd does not have a correlation with Icap, which fluctuates significantly, so that a fluctuation in Ignd can also be suppressed. Accordingly, fluctuations in the ground voltage and the power source voltage of a column that are caused by operations of other columns while the column is subjected to the AD conversion can be suppressed in the photoelectric conversion apparatus including a plurality of columns. This can reduce image quality degradation caused by noise, compared with the case where the second terminal 138 of the capacitor 132 is connected to the second voltage node.

As described above, the second terminal 138 of the capacitor 132 connected to control line VL is connected to the third voltage node to which the transistors M5 and M6 of the comparison unit 122 are connected, whereby image quality deterioration caused by noise can be reduced.

Figure 13:
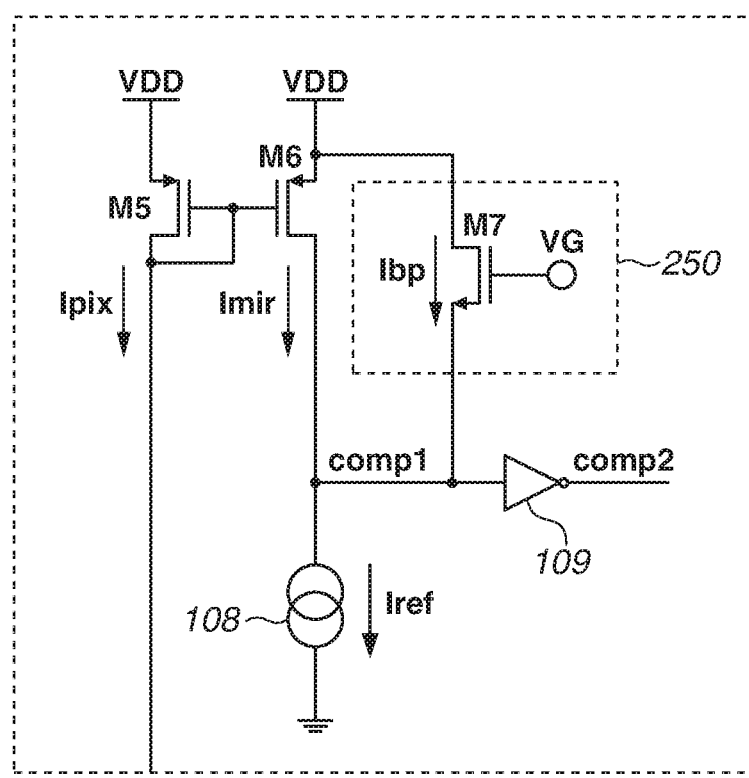
FIG. 13 illustrates a configuration of a reading unit of a photoelectric conversion apparatus.

A photoelectric conversion apparatus according to a sixth exemplary embodiment of the present invention will be described with reference to FIG. 13. In the present exemplary embodiment, the comparison unit 122 in the first to fifth exemplary embodiments is replaced by a comparison unit 222. The comparison unit 222 includes a bypass path 250 in addition to the configuration of the comparison unit 122. The bypass path 250 is provided to bypass a path between a node on the source side of a transistor M6 and a node on the drain side of the transistor M6, i.e., the bypass path 250 is provided in parallel with the transistor M6. The bypass path 250 includes, for example, an n-type metal oxide semiconductor (NMOS) transistor M7 including a gate to which a predetermined voltage VG is applied, a drain connected to a third voltage node (in this example, a power source node that supplies a power source voltage VDD), and a source connected to a current source 108 (node comp1).

An input node of an inverter 109 is denoted by comp1, and an output node of the inverter 109 is denoted by comp2.

Figure 14:
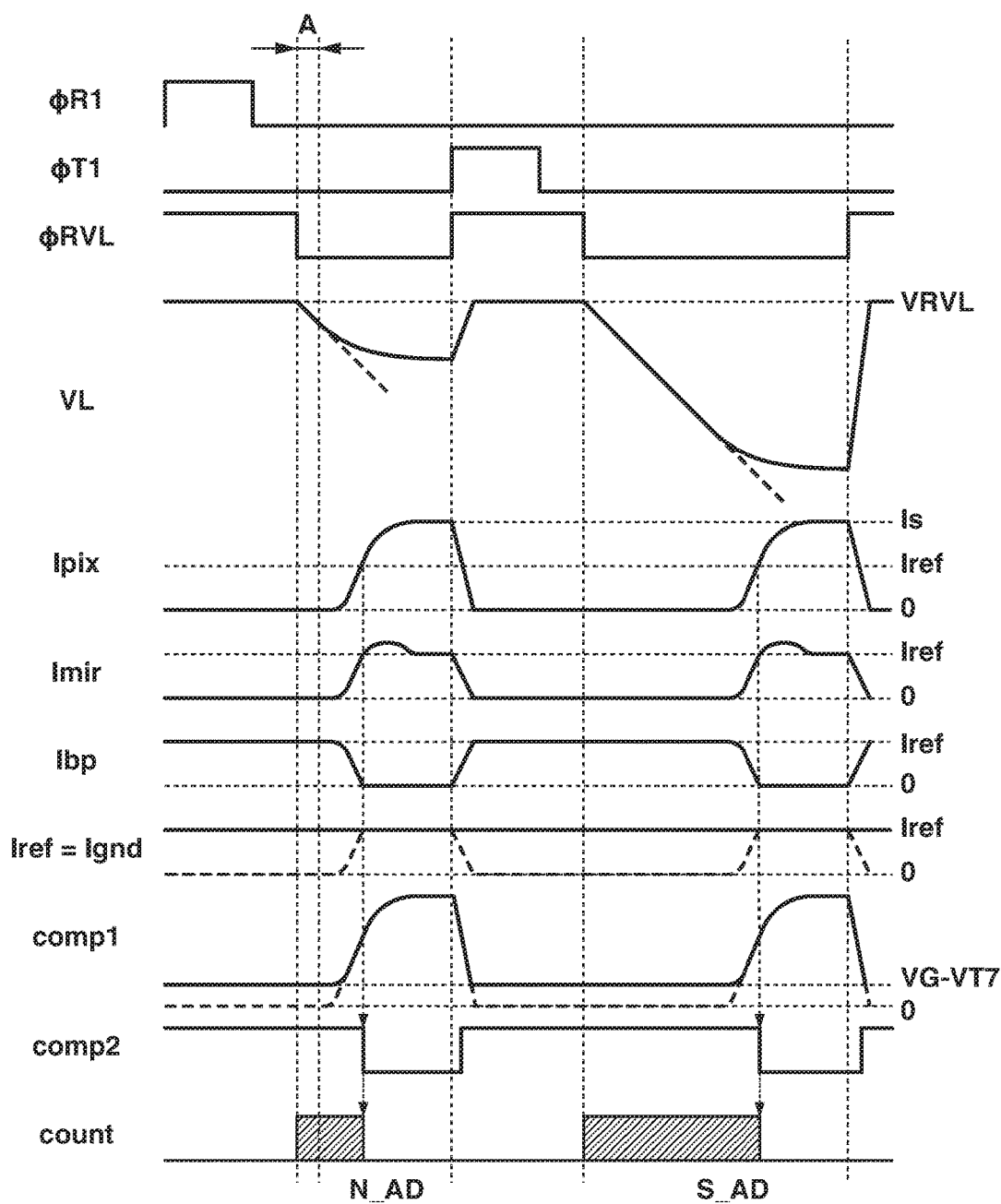
FIG. 14 illustrates a reading operation of signals from pixels.

Operations performed by the photoelectric conversion apparatus according to the present exemplary embodiment will be described with reference to FIG. 14, centering on points that are different from those in the operations illustrated in FIG. 4. Imir denotes a current flowing in the transistor M6. Ibp denotes a current flowing in the transistor M7 (bypass path 250). Iref denotes a reference current flowing in the current source 108. In FIG. 14, a selection signal SEL is not illustrated. The selection signal SEL illustrated in one of FIGS. 4 to 6 can be used.

In a period A of a reading operation N_AD, a voltage V_VL of a control line VL drops linearly, but no pixel current Ipix flows because an amplification transistor M3 of a pixel 112 of the reading target row is off. The transistors M5 and M6 constitute a current mirror circuit, so that no current Imir flows during the period A. The predetermined voltage VG is set to turn on the transistor M7, so that the current Ibp flows as the reference current Iref of the current source 108 through the transistor M7. At this time, the voltage of the node comp1 is about the same as a voltage obtained by subtracting a threshold voltage VT7 of the transistor M7 from the predetermined voltage VG. In one embodiment, the predetermined voltage VG is set in such a manner that the voltage VG-VT7 is higher than a ground voltage and lower than an inversion threshold value of the inverter 109.

If the voltage V_VL of the control line VL continues dropping, the amplification transistor M3 is eventually turned on, and the pixel current Ipix starts flowing. As a result, a current Imir corresponding the size ratio of the transistors M5 and M6 flows through the transistor M6. Both of the transistors M6 and M7 are connected to the current source 108, and the sum of the currents flowing through the transistors M6 and M7 is Iref. Accordingly, the current Ibp decreases, and the voltage of the node comp1 increases. Then, at the time point at which the pixel current Ipix becomes larger and the current Imir becomes equal to the reference current Iref, the current Ibp becomes zero. Thereafter, the current Imir temporarily becomes larger than the reference current Iref, and a charge corresponding to the difference between Imir and Iref is stored in a parasitic capacitance of the node comp1 to thereby increase the voltage of the node comp1. As the voltage of the node comp1 increases, the voltage between the drain and the source of the transistor M6 decreases, whereby the current Imir gradually decreases and is balanced at a value that is equal to the reference current Iref.

In the period during which the voltage of the node comp1 increases, the voltage of the node comp2 is inverted at the time point at which the voltage of the node comp1 exceeds the inversion threshold value of the inverter 109, and the counted value count at this time point is held by the memory 126. Thereafter, the reading operation N_AD is ended, and a reset signal ΦRVL is activated, whereby the amplification transistor M3 is turned off and the flow of the current Ipix stops. At this time, the flow of Imir also stops and, instead, the current Ibp supplies the current of the current source 108 and the voltage of the node comp1 returns to VG-VT7. Subsequent operations in the reading operation S_AD are similar to those in the operation N_AD, so description thereof is omitted.

The current Ibp is caused to flow through the bypass path 250 (transistor M7) in the period during which the pixel current Ipix does not flow, whereby the current flowing in the ground node becomes constant. Further, the voltage of the node comp1 on the low voltage side is set to VG-VT7, which is higher than the ground voltage, whereby the amplitude of a change in the voltage of the node comp1 is restricted. In the photoelectric conversion apparatus including a plurality of columns in which a pitch between the columns is several microns or narrower, large-amplitude signals of other columns affect a column due to crosstalk, and this may become a noise factor to cause image quality deterioration. In other words, image quality deterioration can be restrained by restricting the amplitude of a change in the voltage of the node comp1.

In FIG. 14, the waveforms of the reference current Iref (i.e., the current Ignd flowing in the ground node) and the voltage at the node comp1 in a case where no bypass path 250 is included are indicated by dotted lines. It can be understood that the currents flowing in the ground node during the periods of the reading operations N_AD and S_AD in which the AD conversion is conducted fluctuate due to the absence of the bypass path 250. The ground node has reasonable impedance, so that the current fluctuations may lead to a fluctuation in the ground voltage. In the photoelectric conversion apparatus including the plurality of columns, a ground voltage fluctuation caused by other columns while a column is subjected to the AD conversion may be a noise factor to cause image quality deterioration. In other words, image quality deterioration can be restrained by using the bypass path to restrain a fluctuation in the current flowing in the ground node.

A photoelectric conversion apparatus according to a seventh exemplary embodiment of the present invention will be described with reference to FIG. 15. In the present exemplary embodiment, the comparison unit 122 in the first to fifth exemplary embodiments is replaced by a comparison unit 322. The comparison unit 322 includes an amplitude restriction unit 350 in addition to the configuration of the comparison unit 122. The amplitude restriction unit 350 restricts the amplitude of the voltage of a node comp1. The amplitude restriction unit 350 may include, for example, an NMOS transistor M8 including a gate to which a voltage VG2 is applied, a drain connected to a drain of a transistor M6, and a source connected to a current source 108. The transistor M8 constitutes a part of a path of a reference current Iref output from the current source 108. In other words, the transistor M8 is arranged between the transistor M6 and the current source 108 in the path of the reference current Iref.

Figure 16:
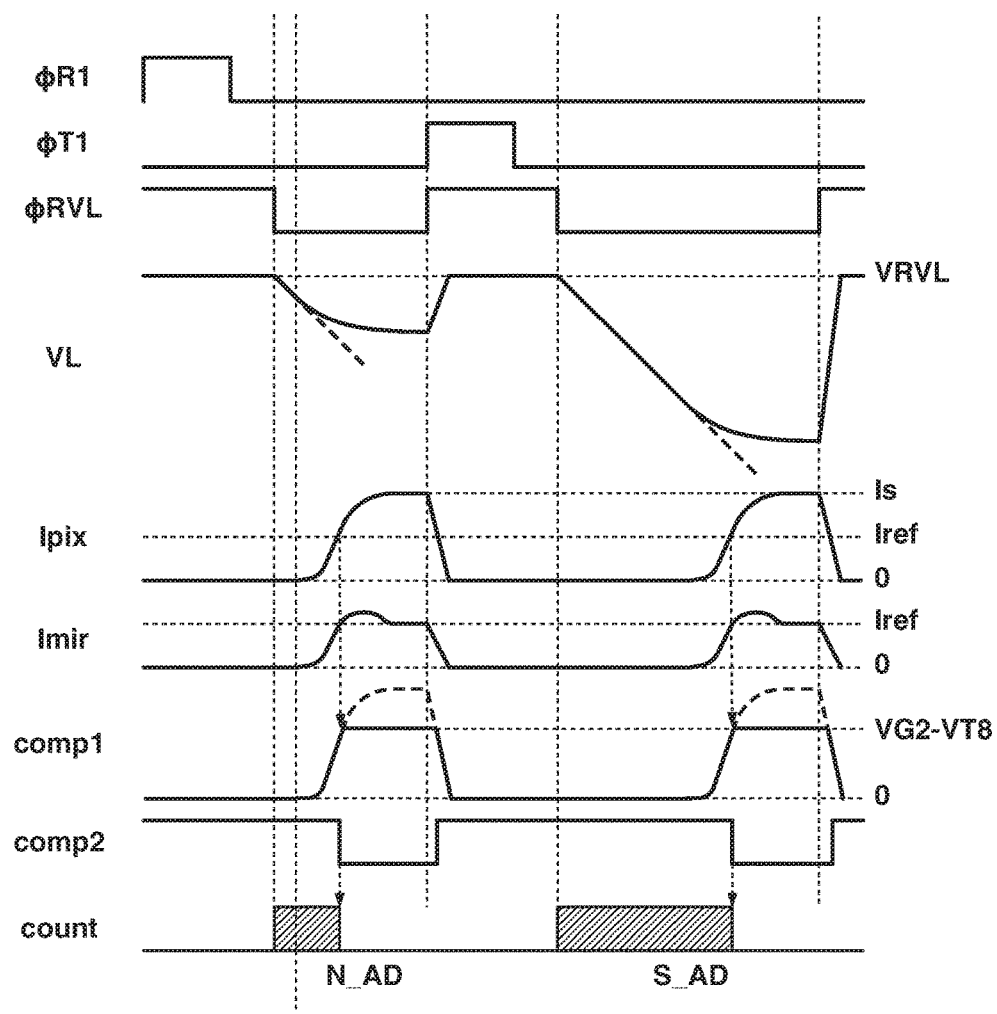
FIG. 16 illustrates a reading operation of signals from pixels.

Operations performed by the photoelectric conversion apparatus according to the present exemplary embodiment will be described with reference to FIG. 16, centering on points that are different from those in the operations illustrated in FIG. 4. In FIG. 16, a selection signal SEL is not illustrated. The selection signal SEL illustrated in one of FIGS. 4 to 6 can be used.

As in FIG. 4, the reading operation N_AD is started and an amplification transistor M3 of a pixel 112 of a reading target row is turned on to start flowing the pixel current Ipix. When the pixel current Ipix flows, a current Imir corresponding to the size ratio of transistors M5 and M6 flows. With this operation, the voltage of a node comp1 increases, but the voltage of the node comp1 is approximately VG2-VT8 (VT8 is a threshold value of the transistor M8), whereby the voltage of the node comp1 on the high voltage side is restrained. In other words, the amplitude of the voltage of the node comp1 is restricted. In the photoelectric conversion apparatus including a plurality of columns in which a pitch between the columns is several microns or narrower, large-amplitude signals of other columns affect a column due to crosstalk, and this may be noise to cause image quality deterioration. In other words, image quality deterioration can be restrained by restricting the amplitude of the voltage of the node comp1. The voltage VG2 is set in such a manner that VG2-VT8 is higher than the inversion threshold value of the inverter 109 so that the inverter 109 is inverted.

Figure 15:
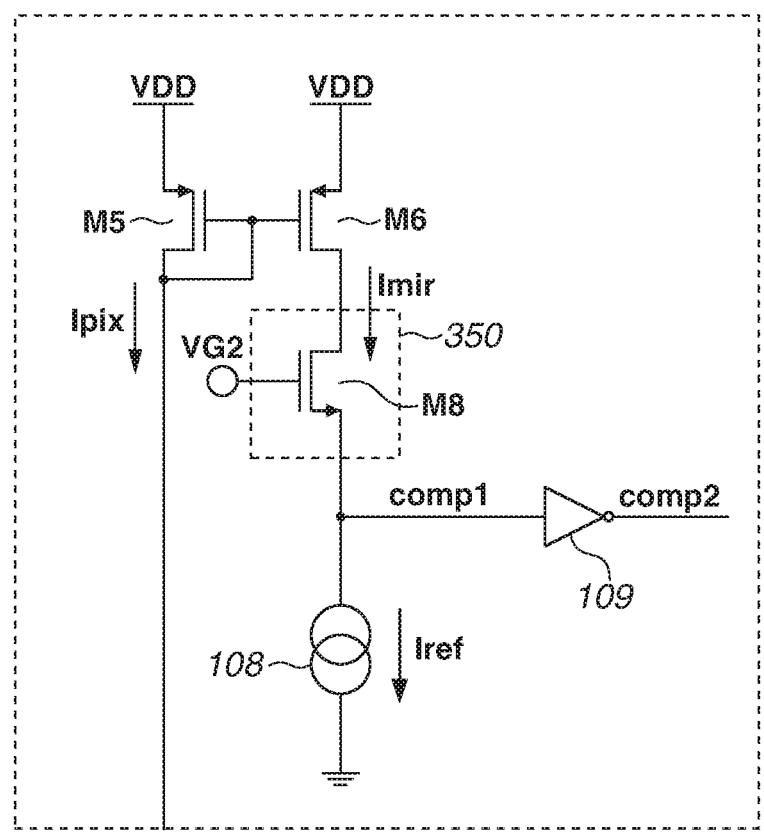
FIG. 15 illustrates a configuration of a reading unit of a photoelectric conversion apparatus.

In the example illustrated in FIG. 15, the voltage VG2 is applied to the gate of the transistor M8, and an enable signal line for controlling the comparison unit 322 to be an operating state or a non-operating state may be connected to the gate of the transistor M8. The power consumption can be reduced by causing the comparison unit 322 to operate when the enable signal is active (high level) while blocking the current path of the comparison unit 322 when the enable signal is inactive (low level).

Figure 17:
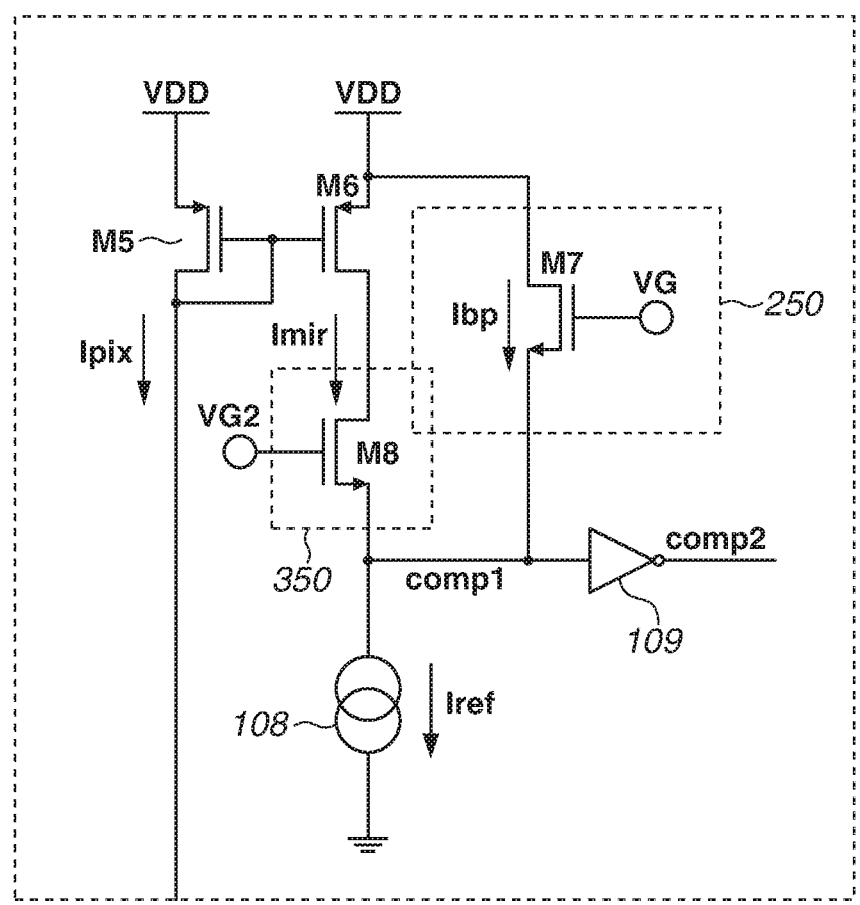
FIG. 17 illustrates a configuration of a reading unit of a photoelectric conversion apparatus.

A photoelectric conversion apparatus according to an eighth exemplary embodiment of the present invention will be described with reference to FIG. 17. In the present exemplary embodiment, the comparison unit 122 in the first to fifth exemplary embodiments is replaced by a comparison unit 422. The comparison unit 422 includes both the bypass path 250 according to the sixth exemplary embodiment and the amplitude restriction unit 350 according to the seventh exemplary embodiment.

Figure 18:
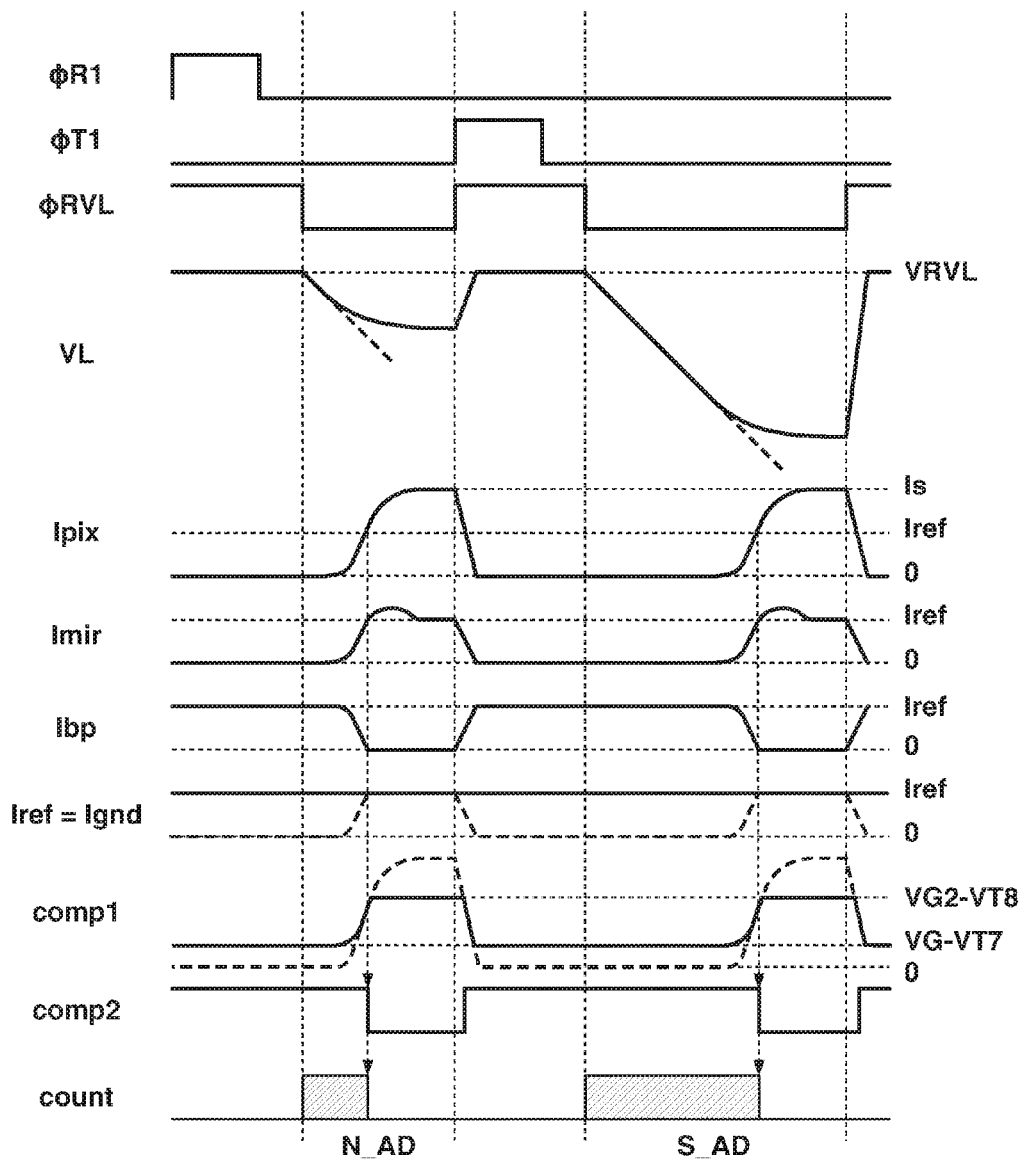
FIG. 18 illustrates a reading operation of signals from pixels.

FIG. 18 illustrates operations of the photoelectric conversion apparatus according to the present exemplary embodiment. In FIG. 18, a selection signal SEL is not illustrated. The selection signal SEL illustrated in one of FIGS. 4 to 6 can be used.

The bypass path 250 and the amplitude restriction unit 350 are included so that a current Ignd flowing in a ground node can be caused constant and the amplitude of the voltage of a node comp1 can be limited within the range of VG2-VT8 to VG-VT7. In other words, in the photoelectric conversion apparatus including a plurality of columns, image quality deterioration caused by ground voltage fluctuation and also image quality deterioration caused by cross talk of large-amplitude signals can be restrained.

Figure 19:
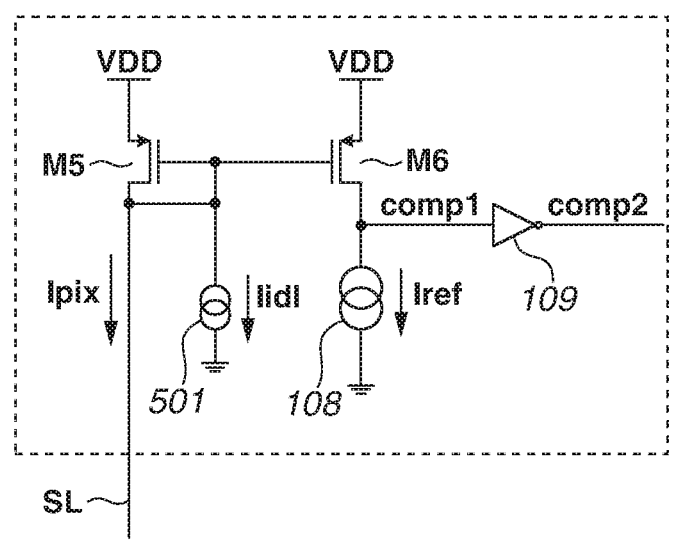
FIG. 19 illustrates a configuration of a reading unit of a photoelectric conversion apparatus.

A photoelectric conversion apparatus according to a ninth exemplary embodiment of the present invention will be described with reference to FIG. 19. In the present exemplary embodiment, the comparison unit 122 in the first to fifth exemplary embodiments is replaced by a comparison unit 522. The comparison unit 522 includes an idle current source 501, which is configured to flow an idle current Iid1, in addition to the configuration of the comparison unit 122. The idle current source 501 is connected to one of a source and a drain (drain in this example) of the amplification transistor M3 through a sensing line SL.

Figure 20:
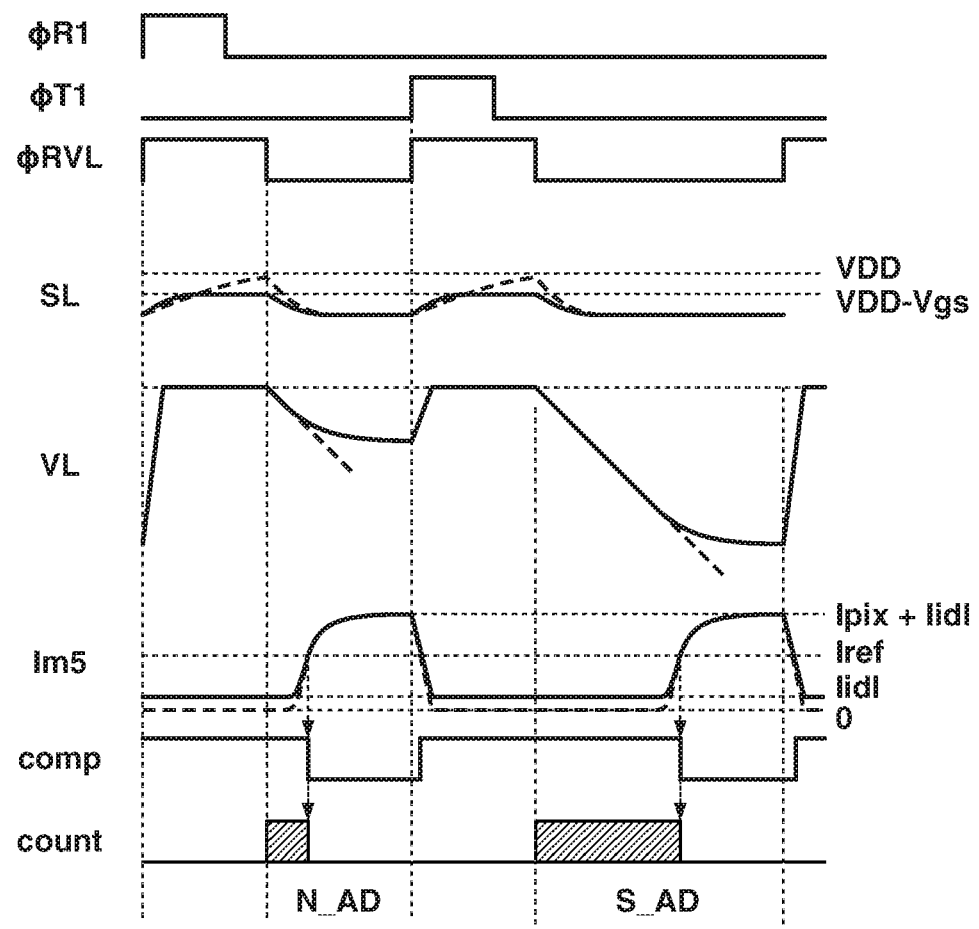
FIG. 20 illustrates a reading operation of signals from pixels.

Operations of a photoelectric conversion apparatus according to the present exemplary embodiment will be described with reference to FIG. 20, centering on points that are different from those in the operations illustrated in FIG. 4. In FIG. 20, a selection signal SEL is not illustrated. The selection signal SEL illustrated in one of FIGS. 4 to 6 can be used.

In response to activation of a reset signal ΦRVL, an amplification transistor M3 is changed to an off state, so that the flow of a current Ipix stops, and only an idle current Iid1 flows in a transistor M5. In this state, the voltage of a sensing line SL increases as a parasitic capacitance of the sensing line SL is charged by the idle current Iid1, and the voltage of a sensing line SL is settled at VDD-Vgs (Vgs is a voltage between a gate and a source of the transistor M5). Further, a current corresponding to the product of the idle current Iid1 and the size ratio M (=(gate width of M6)/(gate width of M5)) of the transistor M6 to the transistor M5 flows through a transistor M6. After the voltages of a control line VL and the sensing line SL are settled and a resetting operation or a transfer operation of a pixel is completed, the reset signal ΦRVL is changed to a non-active state to start an AD conversion operation. Subsequent operations are similar to those in the exemplary embodiments described above, so that description thereof is omitted.

The idle current Iid1 is to be a current value that satisfies the following relation:

$$Iid1 < Iref/M.$$

In FIG. 20, the waveform of the voltage of the sensing line SL and a waveform Im5 of the current flowing in the transistor M5 in a case where no idle current source 501 is included are indicated by dotted lines. Since there is no idle current source 501, when the reset signal ΦRVL is activated, a current determined based on the voltage Vgs between the gate and the source of the transistor M5 is supplied from the transistor M5 and stored in the parasitic capacitance of the sensing line SL, whereby the voltage of the sensing line SL increases. As the voltage of the sensing line SL increases, the voltage between the gate and the source decreases, so that the current supplied form the transistor M5 decreases, and the speed of the increase of the voltage of the sensing line SL also decreases. When Vgs becomes equal to or smaller than a threshold voltage of the transistor M5, the transistor M5 enters a sub-threshold region, so that the amount of current supplied from the transistor M5 decreases exponentially. It is apparent that it takes a long time for the sensing line SL to settle because there is no more current from the transistor M5 and the voltage of the sensing line SL needs to reach VDD.

In a case where the AD conversion operation is started in a state in which the sensing line SL is not sufficiently settled, the voltage between the source and the drain of the amplification transistor M3 in an initial state of each AD conversion operation may possibly vary. This may cause problems that linearity deterioration, fixed pattern noise, and random noise increase in AD conversion may lead to image quality deterioration. Thus, in order to obtain excellent image quality, a sufficient time for the sensing line SL to settle is to be secured.

Thus, the addition of the idle current source 501 as in the present exemplary embodiment makes it possible to reduce the settling time of the sensing line SL so that the speed of the reading time of the photoelectric conversion apparatus can be increased further.

Figure 21:
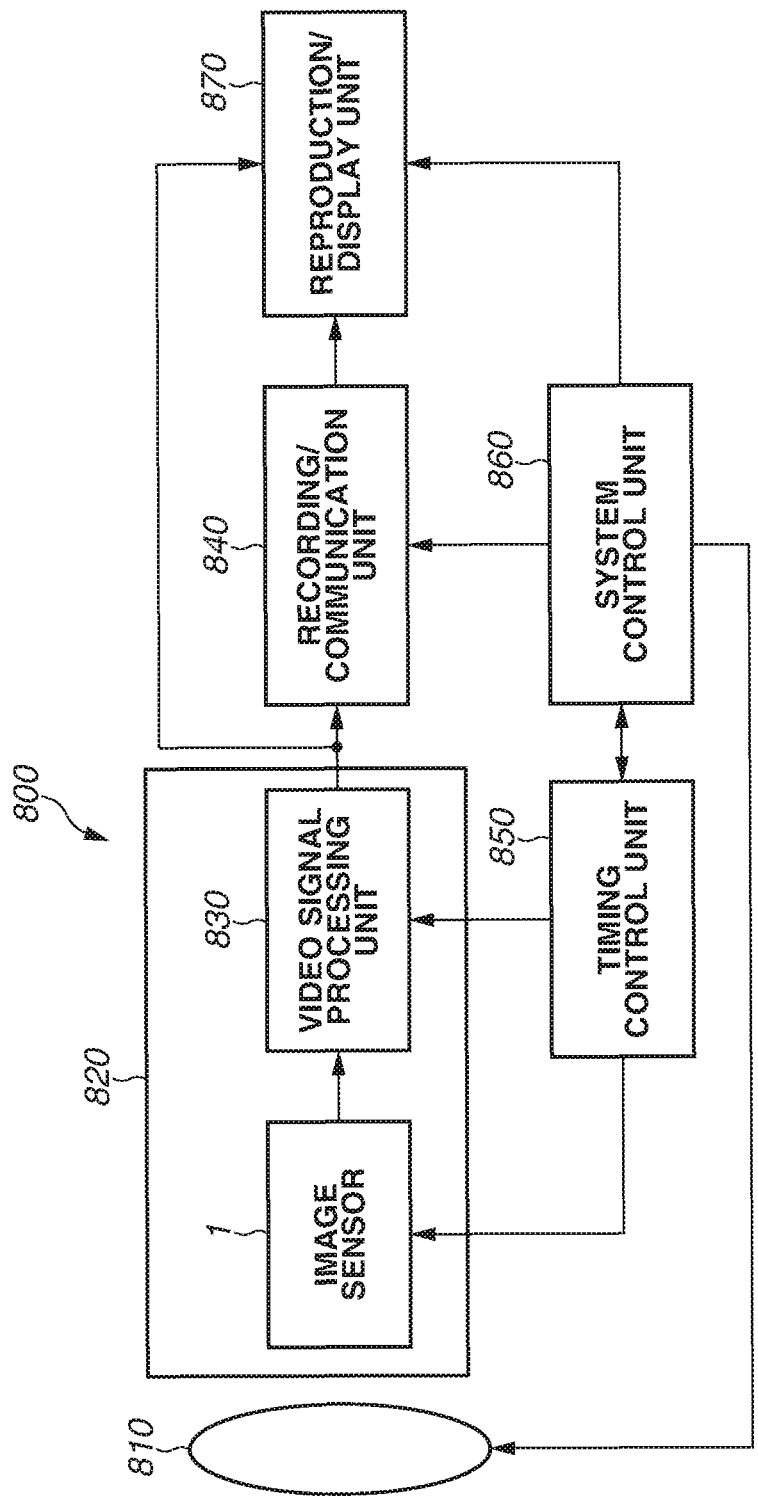
FIG. 21 illustrates a configuration of a photoelectric conversion system.

FIG. 21 illustrates a configuration of a photoelectric conversion system according to an exemplary embodiment of the present invention. A photoelectric conversion system 800 includes, for example, an optical unit 810, an image sensor 1, a video signal processing unit 830, a recording/communication unit 840, a timing control unit 850, a system control unit 860, and a reproduction/display unit 870. An imaging apparatus 820 includes the image sensor 1 and the video signal processing unit 830. The image sensor 1 employs the photoelectric conversion apparatus 100, 100', or 100" described in the above exemplary embodiments.

The optical unit 810, which is an optical system such as a lens, etc., focuses light from a subject onto a pixel unit 10 of the image sensor 1, which includes a plurality of pixels arranged two-dimensionally, whereby an image of the subject is formed thereon. The image sensor 1 outputs at a timing based on a signal from the timing control unit 850 a signal corresponding to the light focused on the pixel unit 10. The signal output from the image sensor 1 is input to the video signal processing unit 830, which is a video signal processing unit, and the video signal processing unit 830 performs signal processing according to a method according to a program, etc. A signal obtained as a result of the processing performed by the video signal processing unit 830 is transmitted as image data to the recording/communication unit 840. The recording/communication unit 840 transmits a signal for forming an image to the reproduction/display unit 870, and causes the reproduction/display unit 870 to reproduce and display a moving image or a still image. Further, the recording/communication unit 840 receives signals from the video signal processing unit 830 to communicate with the system control unit 860 and also performs an operation to record signals for forming images in a recording medium (not illustrated).

The system control unit 860 comprehensively controls the operations of the imaging system and controls the driving of the optical unit 810, the timing control unit 850, the recording/communication unit 840, and the reproduction/display unit 870. Further, the system control unit 860 includes, for example, a storage device (not illustrated), which is a recording medium, to record therein a program, etc., for controlling the operations of the imaging system. Further, for example, the system control unit 860 supplies a signal within the imaging system for switching a driving mode in response to a user operation. Specific examples include a change of a row to read or reset, a change of a field angle caused by electronic zooming, a shift of a field angle caused by electronic image stabilization, etc. The timing control unit 850 controls the driving timings of the image sensor 1 and the video signal processing unit 830 based on the control by the system control unit 860.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-043890, filed Mar. 5, 2015, which is hereby incorporated by reference herein in its entirety.

What is claimed is:

1. A photoelectric conversion apparatus comprising:
 a photoelectric conversion element;
 an amplification transistor including a gate configured to receive a signal based on a charge generated at the photoelectric conversion element;
 at least one transistor connected to the gate;
 a selection transistor provided in series with respect to the amplification transistor and forming a first path through which a current from the amplification transistor flows;
 a first current source configured to output a first reference current to a second path separated from the first path;
 a voltage control unit configured to control a voltage of a control line electrically connected to one of a source and a drain of the amplification transistor; and
 a comparison unit configured to compare the current from the amplification transistor with the first reference current,
 wherein the selection transistor is in a non-conductive state during a period in which the at least one transistor is in a conductive state.

2. The photoelectric conversion apparatus according to claim 1, wherein the at least one transistor is a transfer transistor configured to transfer the charge generated at the photoelectric conversion element.

3. The photoelectric conversion apparatus according to claim 1, wherein the at least one transistor is a reset transistor configured to reset a voltage of the gate.

4. The photoelectric conversion apparatus according to claim 1,
wherein the at least one transistor includes a transfer transistor configured to transfer the charge generated at the photoelectric conversion element and a reset transistor configured to reset a voltage of the gate, and
wherein the selection transistor is in the non-conductive state during each of a period in which the reset transistor is in a conductive state and a period in which the transfer transistor is in a conductive state.

5. The photoelectric conversion apparatus according to claim 1, wherein the voltage control unit includes a switch provided in a path between the control line and a first voltage node configured to supply a first voltage, and a second current source provided in a path between the control line and a second voltage node configured to supply a second voltage.

6. The photoelectric conversion apparatus according to claim 5,
wherein the voltage of the control line is reset to a voltage based on the first voltage by changing the switch to a conductive state, and
wherein the voltage of the control line is changed toward the second voltage by use of the second current source by changing the switch to a non-conductive state.

7. The photoelectric conversion apparatus according to claim 6,
wherein when the voltage of the control line is reset, the amplification transistor is changed to a non-conductive state, and
wherein as a result that the voltage control unit changes the voltage of the control line, the amplification transistor is changed to a conductive state.

8. The photoelectric conversion apparatus according to claim 5, wherein a current value of a second reference current output from the second current source is variable.

9. The photoelectric conversion apparatus according to claim 5, wherein the voltage control unit includes a capacitor including a first node connected to the control line.

10. The photoelectric conversion apparatus according to claim 9, wherein a capacitance value of the capacitor is variable.

11. The photoelectric conversion apparatus according to claim 9,
wherein the capacitor includes a second node which is different from the first node and to which a third voltage is applied, and
wherein the first voltage is a voltage between the second voltage and the third voltage.

12. The photoelectric conversion apparatus according to claim 9,
wherein the capacitor includes a second node which is different from the first node and to which a third voltage is supplied, and
wherein the third voltage is a voltage between the first voltage and the second voltage or equal to the second voltage.

13. The photoelectric conversion apparatus according to claim 1, further comprising a third current source connected to another one of the source and the drain of the amplification transistor.

14. The photoelectric conversion apparatus according to claim 1,
wherein the comparison unit includes a current mirror circuit,
wherein the current mirror circuit includes a first transistor provided in the first path and a second transistor provided in the second path, and
wherein a gate and a drain of the first transistor are short-circuited with each other.

15. The photoelectric conversion apparatus according to claim 14, further comprising a transistor connecting a node on a source side of the second transistor and a node on a drain side of the second transistor to each other.

16. The photoelectric conversion apparatus according to claim 14, further comprising a transistor provided between the second transistor and the first current source in the second path.

17. The photoelectric conversion apparatus according to claim 1, wherein during a period in which the voltage control unit changes the voltage of the control line, the current from the amplification transistor is compared with the first reference current to generate a digital signal corresponding to the signal received by the gate.

18. The photoelectric conversion apparatus according to claim 1, wherein the voltage control unit switches an amount of change in the voltage of the control line per unit time.

19. The photoelectric conversion apparatus according to claim 1, wherein a period during which the selection transistor is in the non-conductive state includes the period during which the at least one transistor is in the conductive state.

20. The photoelectric conversion apparatus according to claim 1, wherein when the at least one transistor is changed from a non-conductive state to the conductive state, the selection transistor is in the non-conductive state.

21. The photoelectric conversion apparatus according to claim 1, further comprising a plurality of pixels each including the photoelectric conversion element, the amplification transistor, and the selection transistor,
wherein one of the source and the drain of the amplification transistor of each of the plurality of pixels is electrically connected to the control line.

22. A photoelectric conversion system comprising:
the photoelectric conversion apparatus according to claim 1; and
a signal processing apparatus configured to process a signal from the photoelectric conversion apparatus.

* * * * *